US012711312B2

(12) United States Patent
Hoffman et al.

(10) Patent No.: US 12,711,312 B2
(45) Date of Patent: Aug. 18, 2026

(54) TUNING GENERATIVE MODELS USING LATENT-VARIABLE INFERENCE

(71) Applicant: Google LLC, Mountain View, CA (US)

(72) Inventors: Matthew Douglas Hoffman, Brooklyn, NY (US); Charles Aloysius Sutton, Santa Clara, CA (US); David Martin Dohan, San Francisco, CA (US); Sholto Francis Alexandre Douglas, San Francisco, CA (US); Tuan Anh Le, Cambridge, MA (US); Van Du Phan, Providence, RI (US); Aaron Thomas Parisi, San Francisco, CA (US); Ryan Michael Rifkin, Oakland, CA (US); Pavel Sountsov, Santa Clara, CA (US); Sharad Vikram, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 196 days.

(21) Appl. No.: 18/653,146

(22) Filed: May 2, 2024

(65) Prior Publication Data

US 2024/0386202 A1 Nov. 21, 2024

Related U.S. Application Data

(60) Provisional application No. 63/502,848, filed on May 17, 2023.

(51) Int. Cl.
*G06F 40/284* (2020.01)

(52) U.S. Cl.
CPC .................................. *G06F 40/284* (2020.01)

(58) Field of Classification Search
CPC ........ G06F 40/284; G06F 40/30; G06F 40/56; G06F 40/35
See application file for complete search history.

(56) References Cited

U.S. PATENT DOCUMENTS

| | | | | |
|---|---|---|---|---|
| 11,429,862 | B2 * | 8/2022 | Chai | G06N 3/0495 |
| 11,676,033 | B1 * | 6/2023 | Menon | G06N 3/084 706/20 |
| 12,175,222 | B1 * | 12/2024 | Benfield | G06N 3/048 |
| 12,347,067 | B2 * | 7/2025 | Misra | G06T 3/4053 |
| 2019/0138889 | A1 * | 5/2019 | Jiang | G06N 3/0455 |
| 2020/0051206 | A1 * | 2/2020 | Munkberg | G06T 5/73 |

(Continued)

OTHER PUBLICATIONS

Anil et al., "PaLM 2 Technical Report" arXiv:2305.10403v3, Sep. 13, 2023, 93 pages.

(Continued)

*Primary Examiner* — Michael Colucci
(74) *Attorney, Agent, or Firm* — DORITY & MANNING P.A.

(57) ABSTRACT

Systems and methods for generative language model tuning can include training the generative language model to generate sets of output text tokens with set of intermediary text tokens with training examples that include input and output pairs. The training can include processing the input with the language model to determine a predicted output and a predicted set of intermediary text tokens. The predicted set of intermediary text tokens can then be evaluated based at least in part on the output associated with the input and the predicted output.

21 Claims, 17 Drawing Sheets

(56) References Cited

U.S. PATENT DOCUMENTS

| | | | | |
|---|---|---|---|---|
| 2021/0133582 | A1* | 5/2021 | Refaat | G06N 3/09 |
| 2021/0350786 | A1* | 11/2021 | Chen | G10L 15/063 |
| 2022/0148571 | A1* | 5/2022 | Wang | G10L 25/18 |
| 2022/0156965 | A1* | 5/2022 | Zheng | G06F 18/251 |
| 2022/0358594 | A1* | 11/2022 | Zhu | G06Q 40/06 |
| 2023/0154055 | A1* | 5/2023 | Besenbruch | G06N 3/084 375/240.03 |
| 2023/0206069 | A1* | 6/2023 | Zhang | G06N 3/045 706/15 |
| 2023/0252971 | A1* | 8/2023 | Qureshi | G10L 13/047 704/259 |
| 2023/0343319 | A1* | 10/2023 | Hu | G06N 3/047 |
| 2023/0368031 | A1* | 11/2023 | Xuan | G06N 3/084 |
| 2024/0300105 | A1* | 9/2024 | Chen | B25J 9/1664 |
| 2025/0086843 | A1* | 3/2025 | Zafar | G06N 3/0464 |
| 2025/0245564 | A1* | 7/2025 | Boren | G06N 3/045 |

OTHER PUBLICATIONS

Bishop, "Pattern Recognition and Machine Learning", Springer, New York, New York, Aug. 17, 2006, 758 pages.
Bornscheim et al., "Reweighted Wake-Sleep", arXiv:1406.2751v4, Apr. 16, 2015, 12 pages.
Burda et al. "Importance Weighted Autoencorders", arXiv:1509.00519v4, Nov. 7, 2016, 14 pages.
Chung et al., "Scaling Instrudction-Finetuned Langauge Models", arXiv:2210.11416v5, Dec. 6, 2022, 54 pages.
Cobbe et al., "Training Verifiers to Solve Math Word Problems", arXiv:2110.14168v2, Nov. 18, 2021, 22 pages.
Cover et al., "Elements of Information Theory", John Wiley & Sons, Inc., Hoboken, New Jersey, United States, Apr. 7, 2005, 774 pages.
Creswell et al., "Selection-Inference: Exploiting Large Language Models for Intepretable Logical Reasoning", arXiv:2205.09712v1, May 19, 2022, 33 pages.
Dohan et al., "Language Model Cascades", arXiv:2207.10342v2, Jul. 28, 2022, 13 pages.
Geman et al., "Stochastic Relaxation, Gibbs Distributions, and the Bayesian Restoration of Images", Institute of Electrical and Electronics Engineers Transactions on Pattern Analyis and Machine Intelligence, vol. PAMI-6, Issue 6, Nov. 1984, 21 pages.
Hastings, "Monte Carlo Sampling Methods Using Markov Chains and their Applications", Biometrika, vol. 57, No. 1, Apr. 1970, 1 pages.
Hewitt et al., "Learning to Learn Generative Programs with Memoised Wake-Sleep", arXiv:2007.03132v2. Jul. 22, 2020, 15 pages.
Hol et al., "On Resampling Algorithms for Particle Filters", 2006 Institute of Electrical and Electronics Engineers Nonlinear Statistical Signal Processing Workshop, Cambridge, United Kingdom, Nov. 12, 2007, 4 pages.
Jouppi et al., "TPU y4: An Optically Reconfigurable Supercomputer for Machine Learning with Hardware Support for Embeddings", arXiv:2304.01433v3, Apr. 20, 2023, 14 pages.
Kingma et al., "Adam: A Method for Stochastic Optimization", arXiv:1412.6980v9, Jan. 30, 2017, 15 pages.
Kingma et al., "Auto-Encoding Variational Bayes", arXiv:1312.6114v11, Dec. 10, 2022, 14 pages.
Kojima et al., "Large Language Models are Zero-Shot Reasoners", arXiv:2205.11916v4, Jan. 29, 2023. 42 pages.
Le et al., "Revisiting Reweighted Wake-Sleep for Models with Stochastic Control Flow", arXiv:1805.10469v2, Sep. 16, 2019, 14 pages.
Lester et al., "The Power of Scale for Parameter-Efficient Prompt Tuning", arXiv:2104.08691v2, Sep. 2, 2021, 15 pages.
Lewkowycz et al., "Solving Quantitative Reasoning Problems with Language Models", arXiv:2206.14858v2, Jul. 1, 2022, 54 pages.
Llevin., "Deep Latent Variable Models for Natural Language Processing", Technical University of Denmark, Kongens, Lyngby, 2022, 232 pages.
Loshchilov et al., "SGDR: Stochastic Gradient Descent with Warm Restarts", arXiv:1608.03983v5, May 3, 2017, 16 pages.
Murphy, "Probabilistic Machine Learning: An Introduction", MIT Press, Cambridge, MA, 2022, 860 pages.
Murray et al., "Notes on The KI-Divergence Between a Markov Chain and its Equibbrium Distribution", The University of Edinburgh, Jun. 24, 2008, 3 pages.
Naesseth et al., "Markovian Score Climbing: Variational Inference with KL (p||q)", arXiv:2003.10374v2. Feb. 22, 2021, 19 pages.
Nielsen, "The Stochastic EM algorithm: Estimation and Asymtotics Results", International Statistical Institute, vol. 6, No. 3, 33 pages.
Nye et al., "Show Your Work: Scratchpads for Intermediate Computation with Language Models", arXiv:2112.00114v1, Nov. 30, 2021, 16 pages.
OpenAI et al., "OPT-4 Technical Report", arXiv:2303.08774v6, Mar. 4, 2024, 100 pages.
Owen et al., "Safe and Effective Importance Sampling", Taylor & Francis, Ltd., vol. 95, Nov. 449, Jun. 1998, 34 pages.
Parisi et al. "TALM: Tool Augmented Language Models", arXiv:2205.12255v1, May 24, 2022, 6 pages.
Phan et al., "Training Chain-of-Thought via Latent-Variable Inference", arXiv:2312.02179v1, Nov. 28, 2023, 23 pages.
Rajand et al. "Explain Yourself! Leveraging Language Models for Commonsense Reasoning", arXiv:1906.02361v1, Jun. 6, 2019, 11 pages.
Roeder et al., "Sticking the Landing: Simple, Lower-Variance Gradient Estimators for Variational Inference", arXiv:1703.09194v3, May 28, 2017, 10 pages.
Schick et al., "Toolformer: Language Models can Teach Themselves to use Tools", arXiv:2302.04761v1, Feb. 9, 2023, 17 pages.
Shion et al., "Reflexion: An Autonomous Agent with Dynamic Memory and Self-Reflection", arXiv:2303.11366v4, Oct. 10, 2023, 19 pages.
Shwartz et al., "Unsupervised Commonsense Question Answering with Self-Talk", arXiv:2004.05483v2, Sep. 15, 2020, 15 pages.
Suzgun et al., "Challenging BIG-Bench Tasks and Whether Chain-of-Thought Can Solve Them", arXiv:2210.09261v1, Oct. 17, 2022, 49 pages.
Talmoor et al., "CommonsenceQA: A Question Answering Challenge Targeting Commonsense Knowledge", arXiv:1811.00937v2, Mar. 15, 2019, 10 pages.
Tieleman, "Training Restricted Boltzmann Machines Using Approximations to the Likelihood Gradient", Twenty-fifth International Conference on Machine Learning, Helsinki, Finland, Jul. 5-9, 2008, 8 pages.
Tierney, "Markov Chains for Exploring Posterior Distributions", Institute of Mathematical Statistics, vol. 22, No. 4, Dec. 1994, 29 pages.
Tucker et al., "REBAR: Low-Variance, Unbiased Gradient Estimates for Discrete Latent Variable Models", arXiv:1703.07370v4, Nov. 6, 2017, 17 pages.
Tarpin et al., "Language Models Don't Always say What They Think: Unfaithful Explanations in Chain-of-Thought Prompting", arXiv:2305.04388v2, Dec. 9, 2023, 32 pages.
Uesato et al., "Solving Math Word Problems with Process- and Outcome-based Feedback"; arXiv:2211.14275v1, Nov. 25, 2022, 29 pages.
Vaswani et al., "Attention is all you Need", arXiv:1706.03762v7, Aug. 2, 2023, 15 pages.
Wang et al., "Self-Consistency Improves Chain of Thought Reasoning in Language Models", arXiv:2203.11171v4, Mar. 7, 2023, 24 pages.
Wei et al., "Chain of Thought Prompting Elicits Reasoning in Large Language Models" arXiv:2201.11903v6, Jan. 10, 2023, 43 pages.
Yao et al., "ReAct: Synergizing Reasoning and Acting in Language Models", arXiv:2210.03629v3, Mar. 10, 2023, 33 pages.
Ye et al., "Explanation Selection Using Unlabeled Data for Chain-of Though Prompting", arXiv:2302.04813v3, Oct. 18, 2023, 19 pages.
Zelikman et al., "STaR: Bootstrapping Reasoning with Reasoning", arXiv:2203.14465v2, May 20, 2022, 30 pages.

(56) References Cited

OTHER PUBLICATIONS

Zhou et al., "Least-to-Most Prompting Enables Complex Reasoning in Large Language Model", arXiv:2205.10625v3, Apr. 16, 2023, 61 pages.

* cited by examiner

Figure 6:
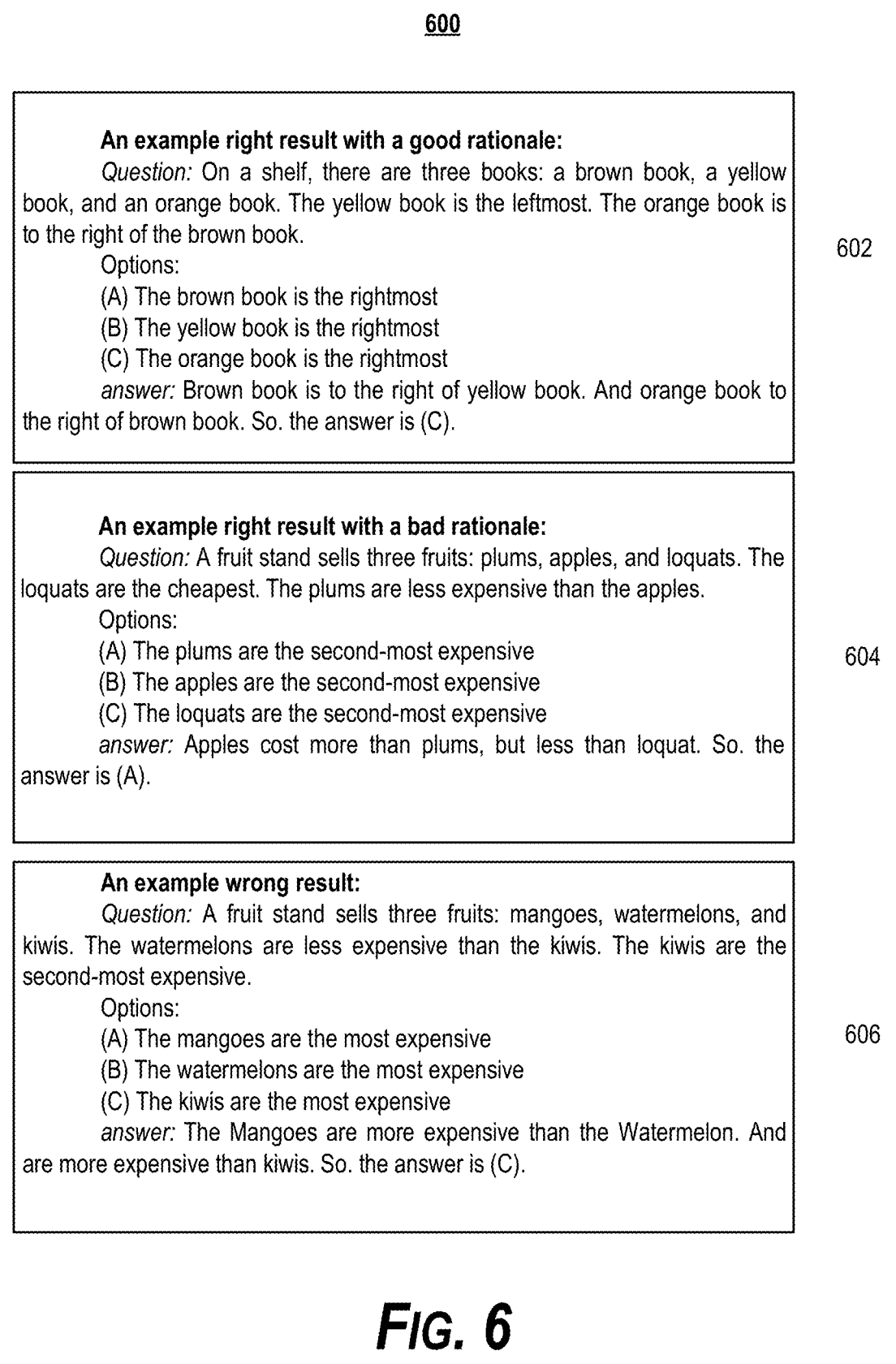

600

An example right result with a good rationale:

*Question:* On a shelf, there are three books: a brown book, a yellow book, and an orange book. The yellow book is the leftmost. The orange book is to the right of the brown book.

Options:

(A) The brown book is the rightmost (B) The yellow book is the rightmost (C) The orange book is the rightmost

*answer:* Brown book is to the right of yellow book. And orange book to the right of brown book. So. the answer is (C).

602

An example right result with a bad rationale:

*Question:* A fruit stand sells three fruits: plums, apples, and loquats. The loquats are the cheapest. The plums are less expensive than the apples.

Options:

(A) The plums are the second-most expensive (B) The apples are the second-most expensive (C) The loquats are the second-most expensive

*answer:* Apples cost more than plums, but less than loquat. So. the answer is (A).

604

An example wrong result:

*Question:* A fruit stand sells three fruits: mangoes, watermelons, and kiwis. The watermelons are less expensive than the kiwis. The kiwis are the second-most expensive.

Options:

(A) The mangoes are the most expensive (B) The watermelons are the most expensive (C) The kiwis are the most expensive

*answer:* The Mangoes are more expensive than the Watermelon. And are more expensive than kiwis. So. the answer is (C).

TUNING GENERATIVE MODELS USING LATENT-VARIABLE INFERENCE

RELATED APPLICATIONS

The present application is based on and claims priority to U.S. Provisional Application No. 63/502,848 having a filing date of May 17, 2023. Applicant claims priority to and the benefit of each of such application and incorporates all such applications herein by reference in its entirety.

FIELD

The present disclosure relates generally to training a chain-of-thought language model. More particularly, the present disclosure relates to training a generative language model to generate chain-of-thought intermediary tokens and output tokens based on a training dataset that includes input and output tokens pairs.

BACKGROUND

Natural language processing models and generative models in general can process prompts and generate responses associated with a variety of topics and/or tasks; however, for certain tasks, the generative model may not provide desirable responses without training for that particular task. Additionally, even with training, the predicted text strings generated for the responses may be inaccurate and may lack grounding in reasoning outside of the learned statistical association from one word to another. The responses may therefore be read as a coherent sentence but may provide inaccurate and/or illogical information.

When a large language model is instructed to work out the answer step by step using “chain-of-thought” prompting, the large language model can generate more accurate and more interpretable responses. However, training a generative model to generate chain-of-thought responses can be difficult as the accessibility to question, rationale, and answer training datasets are limited to a small sample size of examples. Therefore, training on an example triplet may be conducive to training biases of the small sample size training datasets.

SUMMARY

Aspects and advantages of embodiments of the present disclosure will be set forth in part in the following description, or can be learned from the description, or can be learned through practice of the embodiments.

One example aspect of the present disclosure is directed to a computing system for model tuning. The system can include one or more processors and one or more non-transitory computer-readable media that collectively store instructions that, when executed by the one or more processors, cause the computing system to perform operations. The operations can include obtaining a training dataset. The training dataset can include a plurality of training examples. A first training example of the plurality of training examples can include a first input and a respective first set of output tokens associated with the first input. The operations can include obtaining a stored set of intermediary text tokens associated with the first training example. The operations can include processing the first input with the machine-learned model to generate a predicted set of intermediary text tokens and a predicted set of output text tokens. The predicted set of output text tokens can be determined based at least in part on the predicted set of intermediary text tokens. The operations can include determining the predicted set of intermediary text tokens and the stored set of intermediary text tokens are associated with a different result. The operations can include adjusting one or more parameters of the machine-learned model based on a combined gradient of a loss function in response to determining the predicted set of intermediary text tokens and the stored set of intermediary text tokens are associated with a different result. The combined gradient can be based on a difference between a first gradient associated with the stored set of intermediary text tokens and a second gradient associated with the predicted set of intermediary text tokens.

In some implementations, adjusting the one or more parameters of the machine-learned model can include adjusting a probability of the machine-learned model generating an output associated with the stored set of intermediary text tokens. The stored set of intermediary text tokens can be included in the training dataset. The difference between a first gradient associated with the stored set of intermediary text tokens and the second gradient associated with the predicted set of intermediary text tokens can include a weighted difference. The weighted difference can be weighted by a control variate value. The machine-learned model can include a latent-variable model.

In some implementations, the training dataset can include a second training example. The second training example can include a second input and a second set of output tokens. The second set of output tokens can be responsive to the second input. In some implementations, the operations can include processing the second input with the machine-learned model to generate a second predicted set of intermediary text tokens and a second set of predicted output tokens. The second set of predicted output tokens can be determined at least in part on the second predicted set of intermediary text tokens. The operations can include determining the second set of output tokens and the second set of predicted output tokens are associated with a similar result and in response to determining the second set of output tokens and the second set of predicted output tokens are associated with a similar result, replacing a stored second set of intermediary text tokens with the second predicted set of intermediary text tokens in a set of intermediary text tokens memory associated with the second input.

In some implementations, the operations can include processing the first input with the machine-learned model to generate the stored set of intermediary text tokens. Processing the first input with the machine-learned model to generate the predicted set of intermediary text tokens and the predicted set of output text tokens can include temperature being set to one. The machine-learned model can include a chain-of-thought model that is trained to generate an output that includes a set of output text tokens and a set of intermediary text tokens for the set of output text tokens in response to processing an input. In some implementations, determining the predicted set of output text tokens and the first set of output text tokens are associated with a different result can include determining the predicted set of output text tokens is incorrect. The first input can include text data descriptive of an input prompt. The first set of output text tokens can include set of output text tokens token data descriptive of an example set of output text tokens for the input prompt.

In some implementations, the stored set of intermediary text tokens can include a plurality of text strings that are fed back into the machine-learned model to perform a next inference to generate at least one of the next intermediary text token or a plurality of output text tokens. The stored set of intermediary text tokens can be obtained based on a stored set of output tokens for the stored set of intermediary text tokens being determined to be associated with the respective first set of output tokens. In some implementations, the stored set of output tokens can include a text string generated by: processing a stored input with the machine-learned model to generate a first stored intermediary text token of the stored set of intermediary text tokens, processing the stored input and the first stored intermediary text token of the stored set of intermediary text tokens with the machine-learned model one or more next intermediary text tokens of the stored set of intermediary text tokens, and processing the stored input and the stored set of intermediary text tokens with the generative model to generate the stored set of output tokens.

Another example aspect of the present disclosure is directed to a computer-implemented method for generative model training. The method can include obtaining, by a computing system including one or more processors, a training dataset. The training dataset can include a plurality of training examples. In some implementations, a first training example of the plurality of training examples can include a first input and a respective first set of output tokens associated with the first input. The method can include obtaining, by the computing system, a stored set of intermediary text tokens associated with the first training example. The method can include processing, by the computing system, the first input with a machine-learned model to generate a predicted set of intermediary text tokens. The method can include processing, by the computing system, the predicted set of intermediary text tokens with the machine-learned model to generate a predicted set of output text tokens. The method can include determining, by the computing system, the predicted set of output text tokens is associated with an incorrect set of output tokens based on the respective first set of output tokens. The method can include adjusting, by the computing system, one or more parameters of the machine-learned model based on a combined gradient of a loss function in response to determining the predicted set of output text tokens is associated with an incorrect set of output tokens. The combined gradient can be based on a difference between a first gradient associated with the stored set of intermediary text tokens and a second gradient associated with the predicted set of intermediary text tokens.

In some implementations, processing, by the computing system, the first input with the machine-learned model to generate the predicted set of intermediary text tokens can include determining, by the computing system, a plurality of set of intermediary text tokens intermediary text embeddings determined to be associated with the first input; determining, by the computing system, an average set of intermediary text tokens intermediary text embedding for the plurality of set of intermediary text tokens intermediary text embeddings; and generating, by the computing system, the predicted set of intermediary text tokens based on the average set of intermediary text tokens intermediary text embedding. The method can include performing, by the computing system, a plurality of training loops with a particular set of training examples of the plurality of training examples; determining, by the computing system, a subset of the particular set of training examples iteratively generate correct results; and performing, by the computing system, additional training loops with the training dataset without the subset.

In some implementations, the machine-learned model can be trained to determine a joint probability distribution over inputs, output tokens, and intermediary tokens. Adjusting, by the computing system, the one or more parameters of the machine-learned model can include determining a parameter adjustment based at least in part on a control variate. The control variate can reduce the parameter adjustment as a global accuracy of the machine-learned model increases. The global accuracy can be determined based on a probability of generating correct set of intermediary text tokens on the training set. In some implementations, the predicted set of intermediary text tokens can include a sequence of inferences. The predicted set of output text tokens can include a determined result associated with the sequence of inferences.

Another example aspect of the present disclosure is directed to one or more non-transitory computer-readable media that collectively store instructions that, when executed by one or more computing devices, cause the one or more computing devices to perform operations. The operations can include obtaining a prompt. The prompt can be descriptive of input text data. The operations can include processing the prompt with a machine-learned model to generate an output. The output can include a predicted set of output text tokens and a respective predicted set of intermediary text tokens associated with the predicted set of output text tokens. The machine-learned model may have been trained to generate an output set of intermediary text tokens with an output set of output text tokens by training the machine-learned model on training datasets that includes a plurality of input examples and a plurality of output examples. In some implementations, training can include generating the output set of intermediary text tokens and determining whether to store the output set of intermediary text tokens based on comparing the output set of output text tokens to a respective set of output text tokens example for an input example. The operations can include providing the output to a user.

In some implementations, processing the prompt with the machine-learned model to generate the output can include processing the prompt to determine the respective predicted set of intermediary text tokens and processing the prompt and the respective predicted set of intermediary text tokens to generate the predicted set of output text tokens. The respective predicted set of intermediary text tokens can be determined based on one or more stored text tokens. In some implementations, the prompt and the output can include natural language text strings.

Another example aspect of the present disclosure is directed to a computer-implemented method. The method can include obtaining, by a computing system including one or more processors, a triplet training dataset. The triplet training dataset can include a first triplet training set. The first triplet training set can include a training input example, a training set of intermediary text tokens, and a training set of output text tokens. The training set of intermediary text tokens can include data descriptive of a set of intermediary text tokens generated by a first machine-learned model in response to processing the training input example. In some implementations, the first machine-learned model may have been trained on a first loss function that includes a combined gradient that is based on a difference between a first gradient associated with a previously stored set of intermediary text tokens and a second gradient associated with a model inference set of intermediary text tokens. The method can include processing, by the computing system, the training input example with a second machine-learned model to generate a predicted set of intermediary text tokens and a predicted set of output text tokens. The method can include evaluating, by the computing system, a second loss function that evaluates a difference between the predicted set of intermediary text tokens and the training set of intermediary text tokens and adjusting, by the computing system, one or more parameters of the second machine-learned model based at least in part on the second loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts illustrations of example sets of output text tokens according to example embodiments of the present disclosure.

Figure 1:
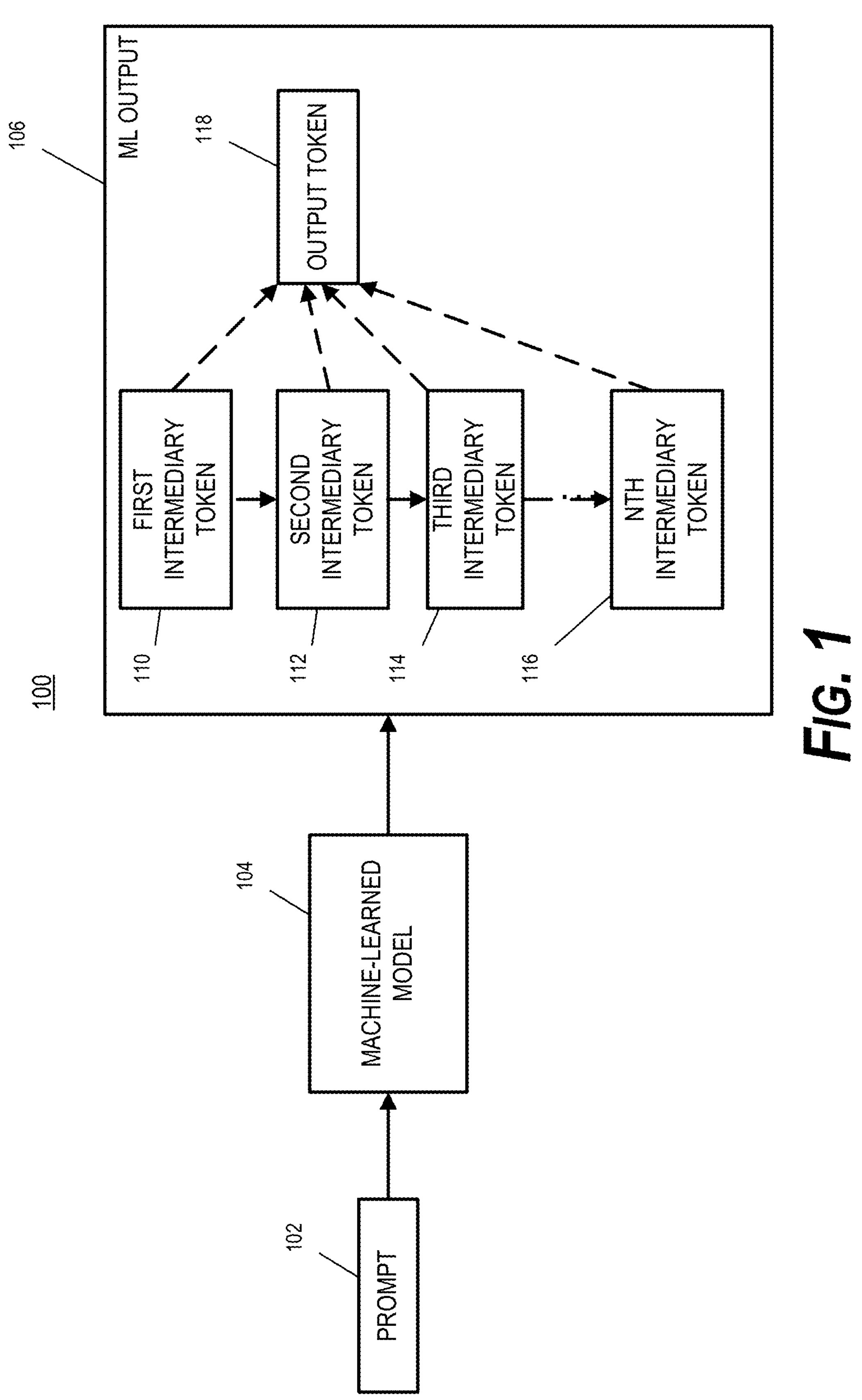
FIG. 1 depicts a block diagram of an example generative chain-of-thought language model system according to example embodiments of the present disclosure.

Reference numerals that are repeated across plural figures are intended to identify the same features in various implementations.

DETAILED DESCRIPTION

Overview

Generally, the present disclosure is directed to training chain-of-inferences via latent-variable inference. In particular, the systems and methods disclosed herein can leverage input (e.g., question) and set of output text tokens (e.g., response) training pairs to determine predicted data that can be evaluated to maximize the marginal log-likelihood of generating a particular set of output text tokens (e.g., a correct response) using chain-of-thought prompting, which may include averaging over a set of possible sets of intermediary text tokens. The systems and methods can process an input (e.g., question) with a language model (e.g., a generative language model) to generate predicted sets of intermediary text tokens that may be stored and/or utilized to determine a gradient based on a generated predicted set of output text tokens (e.g., a response) associated with predicted set of intermediary text tokens. In some implementations, which predicted set of intermediary text tokens to store can be determined based on a determined correctness of the predicted set of output text tokens when comparing the predicted set of output text tokens to the ground truth training response. Additionally and/or alternatively, the systems and methods can utilize a control variate to manage the parameter adjustment based on a determined model performance. The systems and methods can therefore be utilized to train a language model for chain-of-thought response generation without relying on labeled question, rationale, and answer triplets.

For example, the systems and methods can obtain a training dataset. The training dataset can include a plurality of training examples. A first training example of the plurality of training examples can include a first input (e.g., first question) and a respective first set of output tokens (e.g., a first response) associated with the first input.

The systems and methods can obtain a stored set of intermediary text tokens associated with the first training example. The stored set of intermediary text tokens can be a previous model inference. For example, the first input may have been processed with a machine-learned model (e.g., a generative model (e.g., a generative language model)) to generate the stored set of intermediary text tokens. In some implementations, the stored set of intermediary text tokens may be obtained from an initialization training dataset.

The systems and methods can process the first input with a machine-learned model (e.g., a machine-learned language model) to generate a predicted set of intermediary text tokens and a predicted set of output text tokens. The predicted set of output text tokens can be determined based at least in part on the predicted set of intermediary text tokens. The machine-learned model can include a latent-variable model. In some implementations, processing the first input with the machine-learned model to generate the predicted set of intermediary text tokens and the predicted set of output text tokens can include temperature being set to one. The machine-learned model can include a chain-of-thought model that is trained to generate an output that includes a set of output text tokens and a set of intermediary text tokens for the set of output text tokens in response to processing an input. In some implementations, the first input can include text data descriptive of an input prompt. The first set of output text tokens can include set of output text tokens token data descriptive of an example set of output text tokens for the input prompt.

In some implementations, processing the first input with a machine-learned model to generate a predicted set of intermediary text tokens and a predicted set of output text tokens can include processing the first input with the machine-learned model to generate a predicted set of intermediary text tokens. The predicted set of intermediary text tokens may be determined based on one or more learned sequence predictions, one or more learned logic representations, and/or one or more learned other representations. Alternatively and/or additionally, processing the first input with the machine-learned model to generate the predicted set of intermediary text tokens can include determining a plurality of set of intermediary text tokens intermediary text embeddings determined to be associated with the first input, determining an average set of intermediary text tokens intermediary text embedding for the plurality of set of intermediary text tokens intermediary text embeddings, and generating the predicted set of intermediary text tokens based on the average set of intermediary text tokens intermediary text embedding.

Additionally and/or alternatively, processing the first input with a machine-learned model to generate a predicted set of intermediary text tokens and a predicted set of output text tokens can include processing the first input and the predicted set of intermediary text tokens with the machine-learned model to generate the predicted set of output text tokens. The machine-learned model can be trained to determine a joint probability distribution over inputs, outputs, and sets of intermediary text tokens. The predicted set of intermediary text tokens can include a sequence of inferences. In some implementations, the predicted set of output text tokens can include a determined result associated with the sequence of inferences.

The systems and methods can determine the predicted set of intermediary text tokens (and/or the predicted set of output text tokens) and the stored set of intermediary text tokens (and/or the first response) are associated with a different result. In some implementations, determining the predicted set of output text tokens and the first set of output text tokens are associated with a different result can include determining the predicted set of output text tokens is incorrect.

The systems and methods can adjust one or more parameters of the machine-learned model in response to determining the predicted set of intermediary text tokens and the stored set of intermediary text tokens are associated with a different result. The systems and methods can adjust the one or more parameters of the machine-learned model based on a combined gradient of a loss function. The combined gradient can be based on a difference between a first gradient associated with the stored set of intermediary text tokens and a second gradient associated with the predicted set of intermediary text tokens. In some implementations, adjusting the one or more parameters of the machine-learned model can include adjusting a probability of the machine-learned model generating a set of output text tokens associated with a stored set of intermediary text tokens. The stored set of intermediary text tokens can be associated with a text token. In some implementations, adjusting the one or more parameters of the machine-learned model can include determining a parameter adjustment based at least in part on a control variate. The control variate can reduce the parameter adjustment as the machine-learned model's global accuracy increases. The global accuracy can be determined based on a probability of generating correct sets of intermediary text tokens on the training set. Additionally and/or alternatively, the difference between a first gradient associated with the stored set of intermediary text tokens and the second gradient associated with the predicted set of intermediary text tokens can include a weighted difference. The weighted difference can be weighted by a control variate value.

In some implementations, adjusting the one or more parameters of the machine-learned model can include determining a gradient associated with a difference between a stored set of intermediary text tokens and the predicted set of intermediary text tokens and adjusting the one or more parameters based at least in part on the gradient.

Additionally and/or alternatively, the training dataset can include a second training example. The second training example can include a second input and a second set of output tokens. The second set of output tokens can be responsive to the second input. In some implementations, the systems and methods can process the second input with the machine-learned model to generate a second predicted set of intermediary text tokens and a second set of predicted output tokens. The second set of predicted output tokens can be determined at least in part on the second predicted set of intermediary text tokens. The systems and methods can determine the second set of output tokens and the second set of predicted output tokens are associated with a similar result. In some implementations, the systems and methods can replace a stored second set of intermediary text tokens with the second predicted set of intermediary text tokens in a set of intermediary text tokens memory in response to determining the second set of output tokens and the second set of predicted output tokens are associated with a similar result.

In some implementations, the systems and methods can perform a plurality of training loops with a particular set of training examples of the plurality of training examples, determine a subset of the particular set of training examples iteratively generate correct responses, and perform additional training loops with the training dataset without the subset.

The trained machine-learned model can include a generative model that can be utilized for chain-of-thought model inference. For example, the systems and methods can obtain a prompt. The prompt can be descriptive of input text data (e.g., text data descriptive of a question).

The systems and methods can process the prompt with a machine-learned model to generate an output. The output can include a predicted set of output text tokens and a respective predicted set of intermediary text tokens associated with the predicted set of output text tokens. The machine-learned model may have been trained to generate an output set of intermediary text tokens with an output set of output text tokens by training the machine-learned model on training datasets that include a plurality of input examples (e.g., a plurality of question examples) and a plurality of set of output text tokens examples (e.g., a plurality of response examples). In some implementations, training can include generating the output set of intermediary text tokens and determining whether to store the output set of intermediary text tokens based on comparing the output set of output text tokens to a respective set of output text tokens example. The respective predicted set of intermediary text tokens can be determined based on one or more stored text tokens.

In some implementations, processing the prompt with the machine-learned model to generate the set of output text tokens can include processing the prompt to determine the respective predicted set of intermediary text tokens and processing the prompt and the respective predicted set of intermediary text tokens to generate the predicted set of output text tokens.

The systems and methods can provide the output to a user. The prompt and the output can include natural language text strings, diagrams, audio data, image data, and/or multimodal data.

The systems and methods disclosed herein can be utilized for word based proofing, for tutoring, for response interpretability, for teaching logical reasoning, and/or for generating a model that can generate question-answer-intermediary text token triplets that may then be utilized to train other chain-of-thought models. Outside of the accuracy benefits of chain-of-thought prompting, chain-of-thought language models can be utilized for interpretability that can cause the trained models to be useful for helping students solve homework questions, understand debates, and/or generally understand a topic and the reasoning behind one or more concepts. For example, the chain-of-thought language model may be trained for determining which department a problem should be directed to, which may cause the language model to generate a sequence of inferences that includes determining a topic associated with the problem, determining whether the topic is associated with a particular branch of the company, and then determining the department within that branch that is associated with the topic.

The systems and methods may be utilized to tune a plurality of different generative models associated with a plurality of different tasks. The systems and methods can train generative models associated with text generation, image generation, audio generation, latent encoding generation, statistical data generation, and/or multimodal generation. The input prompts can include text data, image data, latent encoding data, audio data, and/or multimodal data. The output response can include text data, image data, latent encoding data, audio data, and/or multimodal data.

The input prompt can include a request for information responsive to a question and/or problem. The set of output tokens can include a response to the input prompt. The set of output tokens can include text data (e.g., a text string), image data (e.g., one or more images), audio data, latent encoding data, multimodal data, and/or other data. The set of output tokens may be generated based on a set of intermediary text tokens. The set of intermediary text tokens can include intermediary model inferences generated with the generative model that is then processed with the generative model to either (1) generate a next intermediary text token and/or (2) the set of output tokens. The set of intermediary text tokens can be descriptive of a logical flow from the input prompt to the set of output tokens (e.g., a rationale chain-of-thought). Each of the intermediary text tokens may include model-generated text that can provide grounding for a next model inference. For example, the input prompt may include a question, the set of output tokens can include the answer to the question, and the set of intermediary text tokens may include a rationale for the answer. The set of intermediary text tokens can include incremental predictions (and/or inferences) that lead to the output.

The systems and methods disclosed herein can be leveraged for multi-part tasks and/or complex tasks. In some implementations, the systems and methods can be configured, tuned, and/or trained for logical reasoning, quantitative reasoning, and/or other tasks.

The systems and methods of the present disclosure provide a number of technical effects and benefits. As one example, the system and methods can be utilized to train a generative model (e.g., a large language model) to perform chain-of-thought response generation. Tuning a language model for chain-of-thought response generation can increase the accuracy and interpretability of the natural language responses. Additionally and/or alternatively, the systems and methods disclosed herein can train a generative model on input and response pairs (e.g., question and answer pairs) to avoid the time and effort of generating training datasets with question-answer-intermediary text token triplets. The systems and methods can instead leverage the input and set of output text tokens pairs to infer sets of intermediary text tokens that can then be evaluated based on the set of output text tokens determined based on the set of intermediary text tokens.

Another example technical effect and benefit relates to improved computational efficiency and improvements in the functioning of a computing system. For example, a technical benefit of the systems and methods of the present disclosure is the ability to reduce the computational resources needed for training by identifying particular inputs and/or particular input types that the model is performing well on and reducing the training loops performed on the well performing sets to focus training to improve on weaker sets. The reduction of training loops can reduce the computational cost of training a model for chain of thought response generation. Additionally and/or alternatively, the parameter adjustments may be determined based at least in part on a control variate, which can improve the average convergence speed for training.

With reference now to the Figures, example embodiments of the present disclosure will be discussed in further detail.

Example Model Arrangements

FIG. 1 depicts a block diagram of an example generative chain-of-thought language model system 100 according to example embodiments of the present disclosure. In particular, the generative chain-of-thought language model system 100 can leverage a machine-learned chain-of-thought model 104 to process a prompt 102 to generate a model output 106 that includes a set of output text tokens 118 determined based on a set of intermediary text tokens that includes multi-step inference (e.g., a plurality of intermediary text tokens (e.g., a plurality of reasoning steps)).

For example, the generative chain-of-thought language model system 100 can leverage chain-of-thought reasoning by prompting, training, and/or configuring a generative language model to generate a response (or set of output text tokens 118) based on performing set of intermediary text tokens prediction (e.g., a set of iterative step by step prediction). The machine-learned chain-of-thought model 104 can be a model trained and/or tuned for chain-of-prompt reasoning and response, which may include bootstrapping sets of intermediary text tokens during training. Moreover, in some implementations, the bootstrapping-based training may include a weighted average of a set of sets of intermediary text tokens obtained via determining a set of stored sets of intermediary text tokens have a predicted correlation with the question of a training prompt (e.g., the prediction may include learning and/or leveraging joint probability distribution over questions, rationales, and answers; the joint distribution may include a marginal distribution of answers given questions, averaging over all possible sets of intermediary text tokens weighted by their probability given the question). The training of the machine-learned chain-of-thought model 104 may include learning a joint probability distribution for questions and answers, and the stored sets of intermediary text tokens may be obtained based on determining the set of intermediary text tokens is associated with a question and/or answer determined to be associated with the prompt. Additionally and/or alternatively, training of the machine-learned chain-of-thought model 104 may include learning set of intermediary text tokens generation based on Markov-chain Monte Carlo (MCMC) expectation-maximization (EM) process combined with a control-variate scheme.

Post-training/tuning, the machine-learned chain-of-thought model 104 can be leveraged for model inference. The model inference can include obtaining a prompt 102. The prompt 102 may include a problem (e.g., a question) a user is requesting a set of output text tokens (e.g., an answer for). The problems can include mathematical, logical, reading comprehension, and/or other problems. The prompt 102 can include a hard prompt (e.g., human-readable input data (e.g., text and/or images)) and/or a soft prompt (e.g., a set of parameters that may have been tuned for a particular downstream task).

The machine-learned chain-of-thought model 104 can then process the prompt 102 to generate a model output 106. The model output 106 can include a set of intermediary text tokens and a set of output text tokens 118 generated based on the set of intermediary text tokens. The set of intermediary text tokens can include a set of intermediary tokens, which can include a first intermediary token 110, a second intermediary token 112, a third intermediary token 114, and/or an nth intermediary token 116. In some implementations, an intermediary token may be determined, predicted, and/or generated based on a preceding intermediary token of the set of intermediary text tokens. The set of output text tokens 118 may be determined based on a last intermediary token of a string of intermediary tokens and/or may be based on processing all and/or a portion of the intermediary tokens of the set of intermediary text tokens.

The set of output text tokens 118 and/or the set of intermediary text tokens can then be provided back to the user who provided the problem associated with the prompt 102.

Figure 2:
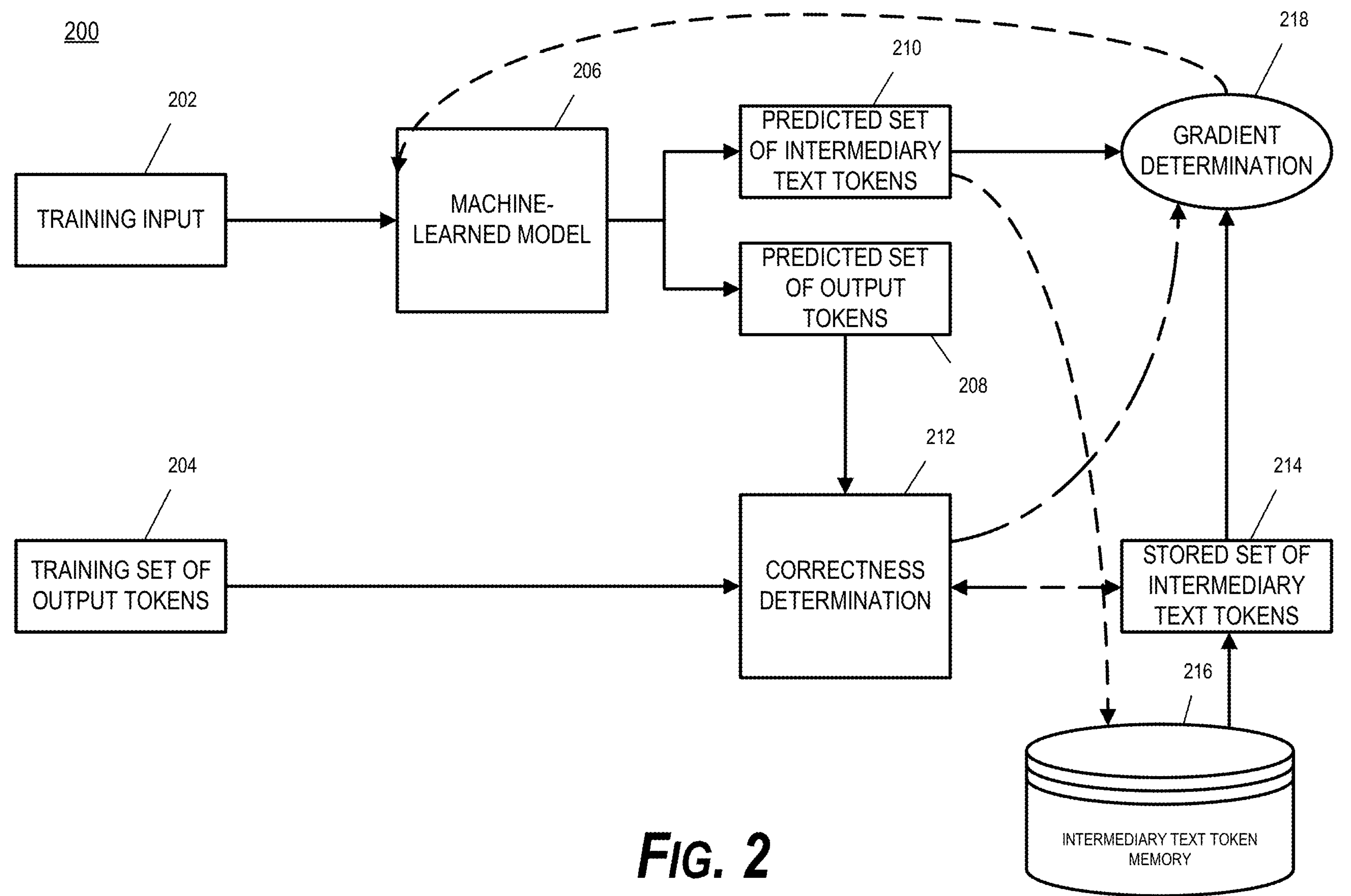
FIG. 2 depicts a block diagram of an example generative language model training system according to example embodiments of the present disclosure.

FIG. 2 depicts a block diagram of an example generative language model training system 200 according to example embodiments of the present disclosure. In some implementations, the generative language model training system 200 is trained to receive a training input 202 descriptive of an example prompt (e.g., an example question) and, as a result of receipt of the training input 202, provide an output that includes a predicted set of output text tokens 208 (e.g., a predicted answer) and a predicted set of intermediary text tokens 210 for that predicted set of output text tokens 208. Thus, in some implementations, the generative language model training system 200 can include a machine-learned model 206 (e.g., a machine-learned language model) that is operable to process a prompt and generate a natural language chain-of-thought response.

In particular, the generative language model training system 200 can obtain a training dataset that includes a plurality of training examples. Each training example may include a training input 202 and a respective training set of output text tokens 204 (e.g., a respective training answer for the training question) that is responsive to the training input 202. The training input 202 can be processed with a machine-learned model 206 (e.g., a text-to-text generative model that may include an autoregressive language model) to generate a predicted set of output text tokens 208 and a predicted set of intermediary text tokens 210. The predicted set of intermediary text tokens 210 may be descriptive of a sequence of inferences that led to the result of the predicted set of output text tokens 208. In some implementations, the predicted set of output text tokens 208 may be determined based on the predicted set of intermediary text tokens 210. For example, the machine-learned model 206 may first determine a predicted set of intermediary text tokens 210 based on the training input 202, then determine a predicted set of output text tokens 208 based on the training input 202 and/or the determined predicted set of intermediary text tokens 210.

The predicted set of output text tokens 208 may then be processed to determine if the predicted set of output text tokens is acceptable and/or correct. For example, the correctness determination 212 may be based on comparing the predicted set of output text tokens 208 to the training set of output text tokens 204. If the predicted set of output text tokens 208 and the training set of output text tokens 204 are associated with one another, the predicted set of output text tokens 208 may be determined to be correct and/or acceptable. Alternatively and/or additionally, if the predicted set of output text tokens 208 and the training set of output text tokens 204 are determined to be associated with different results, the predicted set of output text tokens 208 may be determined to be incorrect and/or unacceptable.

If the predicted set of output text tokens 208 is determined to be correct, the associated predicted set of intermediary text tokens 210 may be added to an intermediary text token memory 216 as a text token for future set of intermediary text tokens determination and/or generation. In some implementations, the predicted set of intermediary text tokens 210 may replace a previously stored set of intermediary text tokens 214 in the intermediary text token memory 216 associated with the machine-learned model 206.

If the predicted set of output text tokens 208 is determined to be incorrect, a stored set of intermediary text tokens 214 associated with training input 202 and/or a similar input embedding may be obtained. The predicted set of intermediary text tokens 210 may then be compared to the stored set of intermediary text tokens 214 to perform a gradient determination 218. The output gradient of the gradient determination 218 may then be backpropagated to the machine-learned model 206 to adjust one or more parameters. The one or more parameters may be adjusted such that the probability of the stored set of intermediary text tokens 214 text token being used for the training input 202 is increased, while the probability of the predicted set of intermediary text tokens 210 being utilized is decreased. In some implementations, the one or more parameters may be adjusted based on a combined gradient of a loss function. The combined gradient can be based on a difference between a first gradient associated with the stored set of intermediary text tokens and a second gradient associated with the predicted set of intermediary text tokens.

In some implementations, the correctness determination 212 may be based on the stored set of intermediary text tokens 214. Alternatively and/or additionally, the correctness determination 212 may be utilized to determine and/or adjust what stored set of intermediary text tokens 214 is selected. In some implementations, the correctness determination 212 may be utilized to perform the gradient determination 218.

FIG. 6 depicts illustrations of example sets of output text tokens 600 according to example embodiments of the present disclosure. In particular, the systems and methods disclosed herein can jointly train a generative language model for set of intermediary text tokens generation and answer generation (e.g., set of output text tokens generation). By training the generative language model for set of intermediary text tokens generation, the systems and methods can leverage chain-of-thought prompting for performing reason-based response generation (e.g., the set of output text tokens may be generated based on the set of intermediary text tokens, which can improve accuracy). FIG. 6 depicts possible generated answers that may be generated by a generative language model based on processing an input question.

For example, the first example set of output text tokens 602 includes an example right answer with a good set of intermediary text tokens that properly generates logical reasoning predictions that are then utilized to determine the correct answer. However, during training, there may be instances in which the right answer is predicted, but the set of intermediary text tokens may be bad. The second example set of output text tokens 604 includes an example right answer with a bad rationale. Therefore, the parameters of the generative language model may be adjusted despite a correct answer being generated. The third example set of output text tokens 606 includes a wrong answer despite the set of intermediary text tokens reciting correct information. During training, instances of the third example set of output text tokens 606 type may cause parameters of the generative language model to be adjusted based on a loss function that evaluates the differences between predicted answers and ground truth answers.

Example Methods

Figure 3:
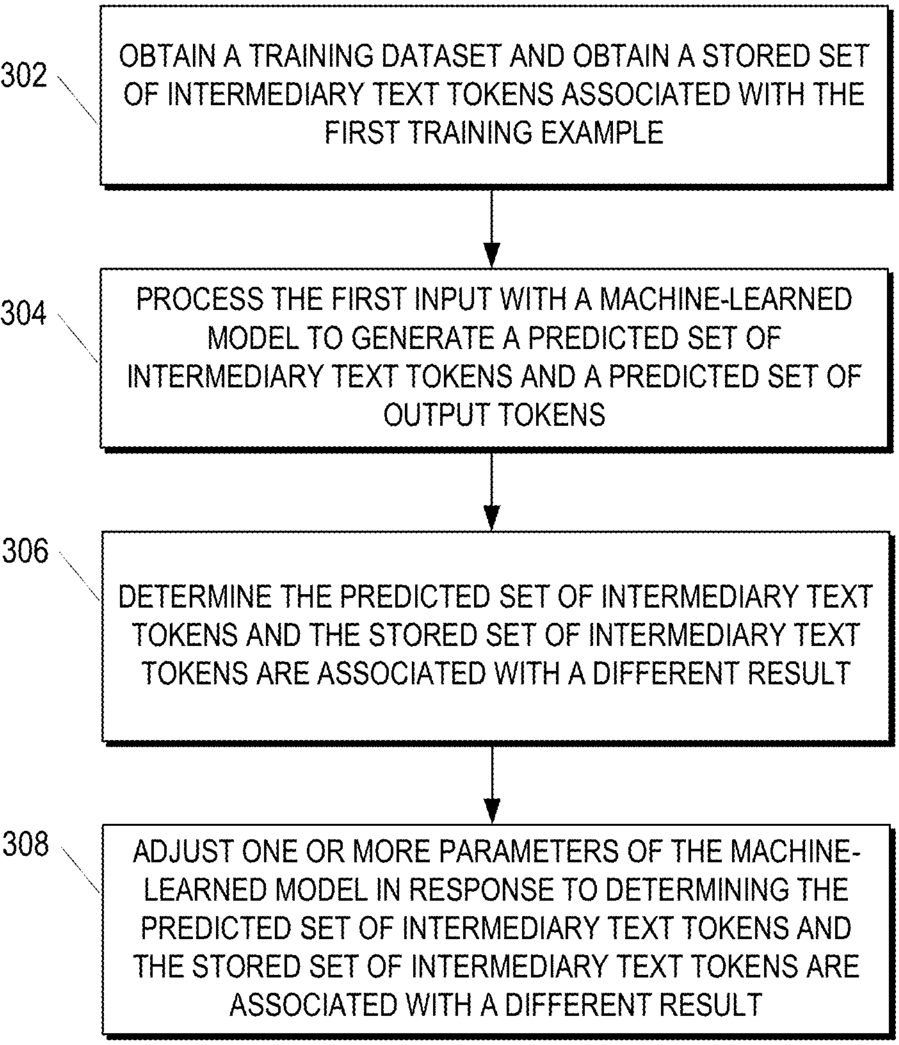
FIG. 3 depicts a flow chart diagram of an example method to perform chain-of-thought language model training according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a training dataset and can obtain a stored set of intermediary text tokens associated with the first training example. The training dataset can include a plurality of training examples. A first training example of the plurality of training examples can include a first input (e.g., first question) and a respective first set of output tokens (e.g., a first answer) associated with the first input. The training examples may be associated with complex problems that may rely on logical reasoning, quantitative reasoning, reading comprehension, and/or other reasoning tasks.

The stored set of intermediary text tokens can be a previous model inference. For example, the first input may have been processed with a machine-learned model (e.g., a generative model (e.g., a generative language model)) to generate the stored set of intermediary text tokens. In some implementations, the stored set of intermediary text tokens may be obtained from an initialization training dataset.

In some implementations, the stored set of intermediary text tokens can include a plurality of text strings that are fed back into the machine-learned model to perform a next inference to generate at least one of the next intermediary text token or a plurality of output text tokens. The stored set of intermediary text tokens can be obtained based on a stored set of output tokens for the stored set of intermediary text tokens being determined to be associated with the respective first set of output tokens. In some implementations, the stored set of output tokens can include a text string generated by: processing a stored input with the machine-learned model to generate a first stored intermediary text token of the stored set of intermediary text tokens, processing the stored input and the first stored intermediary text token of the stored set of intermediary text tokens with the machine-learned model one or more next intermediary text tokens of the stored set of intermediary text tokens, and processing the stored input and the stored set of intermediary text tokens with the generative model to generate the stored set of output tokens.

At 304, the computing system can process the first input with a machine-learned model (e.g., a machine-learned language model) to generate a predicted set of intermediary text tokens and a predicted set of output text tokens. The predicted set of output text tokens can be determined based at least in part on the predicted set of intermediary text tokens. The machine-learned model can include a latent-variable model. In some implementations, processing the first input with the machine-learned model to generate the predicted set of intermediary text tokens and the predicted set of output text tokens can include temperature being set to one. The machine-learned model can include a chain-of-thought model that is trained to generate an output that includes a set of output text tokens and a set of intermediary text tokens for the set of output text tokens in response to processing an input. In some implementations, the first input can include text data descriptive of an input prompt. The first set of output text tokens can include token data descriptive of an example set of output text tokens for the input prompt.

In some implementations, processing the first input with a machine-learned model to generate a predicted set of intermediary text tokens and a predicted set of output text tokens can include processing the first input with the machine-learned model to generate a predicted set of intermediary text tokens. In some implementations, processing the first input with the machine-learned model to generate the predicted set of intermediary text tokens can include determining a plurality of intermediary text embeddings determined to be associated with the first input, determining an average set of intermediary text tokens intermediary text embedding for the plurality of intermediary text embeddings, and generating the predicted set of intermediary text tokens based on the average intermediary text embedding.

Additionally and/or alternatively, processing the first input with a machine-learned model to generate a predicted set of intermediary text tokens and a predicted set of output text tokens can include processing the first input and the predicted set of intermediary text tokens with the machine-learned model to generate the predicted set of output text tokens. The machine-learned model can be trained to determine a joint probability distribution over inputs, outputs, and rationales. The predicted set of intermediary text tokens can include a sequence of inferences. In some implementations, the predicted set of output text tokens can include a determined result associated with the sequence of inferences.

At 306, the computing system can determine the predicted set of intermediary text tokens (and/or the predicted set of output text tokens) and the stored set of intermediary text tokens (and/or the first response) are associated with a different result. In some implementations, determining the predicted set of intermediary text tokens and the stored set of intermediary text tokens are associated with a different result can include determining the predicted set of output text tokens is incorrect.

At 308, the computing system can adjust one or more parameters of the machine-learned model in response to determining the predicted set of intermediary text tokens and the stored set of intermediary text tokens are associated with a different result. The computing system can adjust the one or more parameters of the machine-learned model based on a combined gradient of a loss function. The combined gradient can be based on a difference between a first gradient associated with the stored set of intermediary text tokens and a second gradient associated with the predicted set of intermediary text tokens. Determining the first gradient and the second gradient may include determining respective sets of output text tokens (e.g., a predicted set of output text tokens and a stored response) based on the respective sets of intermediary text tokens (e.g., the predicted set of intermediary text tokens and the stored set of intermediary text tokens) and comparing each of the respective sets of output text tokens against the ground truth training set of output text tokens (e.g., a first gradient may be based on differences between the predicted set of output text tokens and the ground truth training response, while a second gradient may be based on differences between the stored set of output text tokens and the ground truth training response). In some implementations, adjusting the one or more parameters of the machine-learned model can include adjusting a probability of the machine-learned model generating a set of output text tokens associated with a stored set of intermediary text tokens. The stored set of intermediary text tokens can be associated with a text token. In some implementations, adjusting the one or more parameters of the machine-learned model can include determining a parameter adjustment based at least in part on a control variate. The control variate can reduce the parameter adjustment as the machine-learned model's global accuracy increases. The global accuracy can be determined based on a probability of generating correct sets of intermediary text tokens on the training set. Additionally and/or alternatively, the difference between a first gradient associated with the stored set of intermediary text tokens and the second gradient associated with the predicted set of intermediary text tokens can include a weighted difference. The weighted difference can be weighted by a control variate value.

In some implementations, adjusting the one or more parameters of the machine-learned model can include determining a gradient associated with a difference between a stored set of intermediary text tokens and the predicted set of intermediary text tokens and adjusting the one or more parameters based at least in part on the gradient. In some implementations, the adjustment may be based on back-propagating a first gradient descent associated with evaluating a first loss function and a second gradient descent associated with evaluating a second loss function. The first loss function can be evaluated based on a difference between the predicted set of intermediary text tokens and the stored set of intermediary text tokens. The second loss function can be evaluated based on a difference between the predicted set of output text tokens and the ground truth set of output tokens.

Additionally and/or alternatively, the training dataset can include a second training example. The second training example can include a second input and a second set of output tokens. The second set of output tokens can be responsive to the second input. In some implementations, the computing system can process the second input with the machine-learned model to generate a second predicted set of intermediary text tokens and a second set of predicted output tokens. The second set of predicted output tokens can be determined at least in part on the second predicted set of intermediary text tokens. The computing system can determine the second set of output tokens and the second set of predicted output tokens are associated with a similar result. In some implementations, the computing system can replace a stored second set of intermediary text tokens with the second predicted set of intermediary text tokens in a set of intermediary text tokens memory in response to determining the second set of output tokens and the second set of predicted output tokens are associated with a similar result.

In some implementations, the computing system can perform a plurality of training loops with a particular set of training examples of the plurality of training examples, determine a subset of the particular set of training examples iteratively generate correct responses, and perform additional training loops with the training dataset without the subset.

Figure 4:
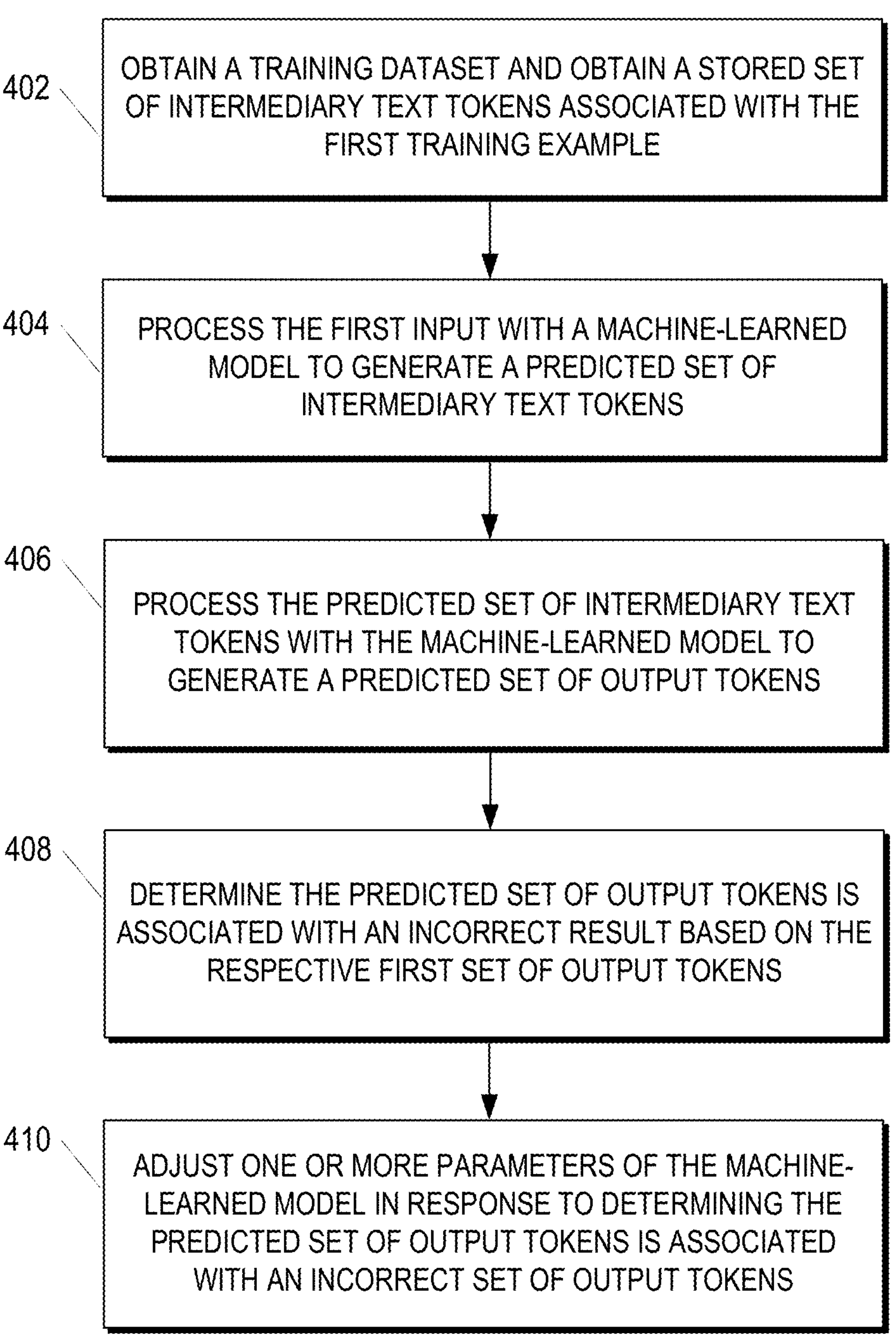
FIG. 4 depicts a flow chart diagram of an example method to perform set of intermediary text tokens inference based language model training according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain a training dataset and can obtain a stored set of intermediary text tokens associated with the first training example. The training dataset can include a plurality of training examples. A first training example of the plurality of training examples can include a first input and a respective first set of output tokens associated with the first input. The stored set of intermediary text tokens may be part of the training dataset and/or may be a previously generated predicted set of intermediary text tokens generated in response to processing the first input with a machine-learned language model.

At 404, the computing system can process the first input with a machine-learned model to generate a predicted set of intermediary text tokens. In some implementations, processing the first input with the machine-learned model to generate the predicted set of intermediary text tokens can include determining a plurality of intermediary text embeddings determined to be associated with the first input, determining an average intermediary text embedding for the plurality of intermediary text embeddings, and generating the predicted set of intermediary text tokens based on the average intermediary text embedding.

At 406, the computing system can process the predicted set of intermediary text tokens with the machine-learned model to generate a predicted set of output text tokens. The machine-learned model can be trained to determine a joint probability distribution over inputs, responses, and rationales. The predicted set of intermediary text tokens can include a sequence of inferences. In some implementations, the predicted set of output text tokens can include a determined result associated with the sequence of inferences.

At 408, the computing system can determine the predicted set of output text tokens is associated with an incorrect answer based on the respective first set of output tokens. The determination may be performed with a separate language model and/or the machine-learned model. In some implementations, the determination may be performed based on evaluating a loss function based on the predicted set of output text tokens and the respective first set of output tokens.

At 410, the computing system can adjust one or more parameters of the machine-learned model in response to determining the predicted set of output text tokens is associated with an incorrect set of output tokens. The computing system can adjust the one or more parameters of the machine-learned model based on a combined gradient of a loss function. The combined gradient can be based on a difference between a first gradient associated with the stored set of intermediary text tokens and a second gradient associated with the predicted set of intermediary text tokens. In some implementations, adjusting the one or more parameters of the machine-learned model can include determining a parameter adjustment based at least in part on a control variate. The control variate can reduce the parameter adjustment as the machine-learned model's global accuracy increases. The global accuracy can be determined based on a probability of generating correct sets of intermediary text tokens on the training set.

In some implementations, the computing system can perform a plurality of training loops with a particular set of training examples of the plurality of training examples, determine a subset of the particular set of training examples iteratively generate correct sets of output text tokens (e.g., correct answers), and perform additional training loops with the training dataset without the subset.

Figure 5:
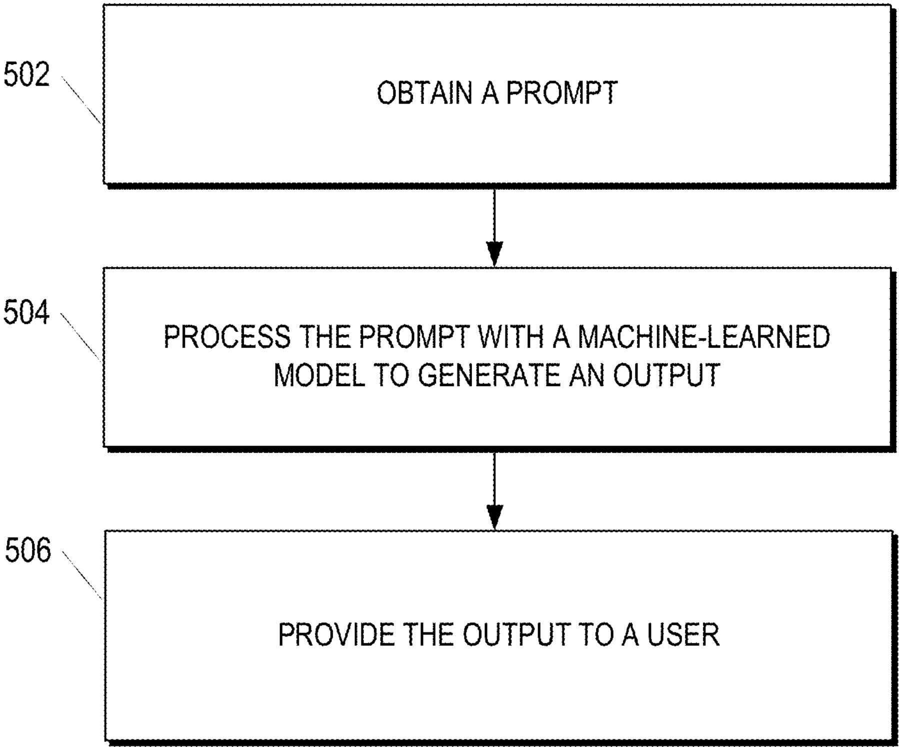
FIG. 5 depicts a flow chart diagram of an example method to perform chain-of-thought language model inference according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a prompt. The prompt can be descriptive of input text data (e.g., text data descriptive of a question). The prompt can include text data, image data, audio data, multimodal data, latent encoding data, and/or other data. The prompt may include a hard prompt (e.g., human-readable data (e.g., natural language text)) and/or a soft prompt (e.g., a set of tuned variable weights trained while weights of a generative model were fixed).

At 504, the computing system can process the prompt with a machine-learned model to generate an output. The output can include a predicted set of output text tokens and a respective predicted set of intermediary text tokens associated with the predicted set of output text tokens. The machine-learned model may have been trained to generate an output set of intermediary text tokens with an output response (e.g., a set of output tokens) by training the machine-learned model on training datasets that include a plurality of input examples (e.g., a plurality of question examples) and a plurality of output text tokens examples (e.g., a plurality of answer examples). In some implementations, training can include generating the output set of intermediary text tokens and determining whether to store the output set of intermediary text tokens based on comparing the output set of output text tokens to a respective set of output text tokens example. The respective predicted set of intermediary text tokens can be determined based on one or more stored text tokens.

In some implementations, processing the prompt with the machine-learned model to generate the set of output text tokens can include processing the prompt to determine the respective predicted set of intermediary text tokens and processing the prompt and the respective predicted set of intermediary text tokens to generate the predicted set of output text tokens.

At 506, the computing system can provide the output to a user. The prompt and the output can include natural language text strings. The output may be provided in a graphical user interface. The predicted set of intermediary text tokens and the predicted set of output text tokens may be labeled (and/or annotated). The output may be stored and then leveraged for training a second machine-learned model for chain-of-thought tuning. The output and the prompt may be processed with an embedding model and/or the machine-learned model to generate an answer embedding and a question embedding for the joint probability distribution.

Figure 7:
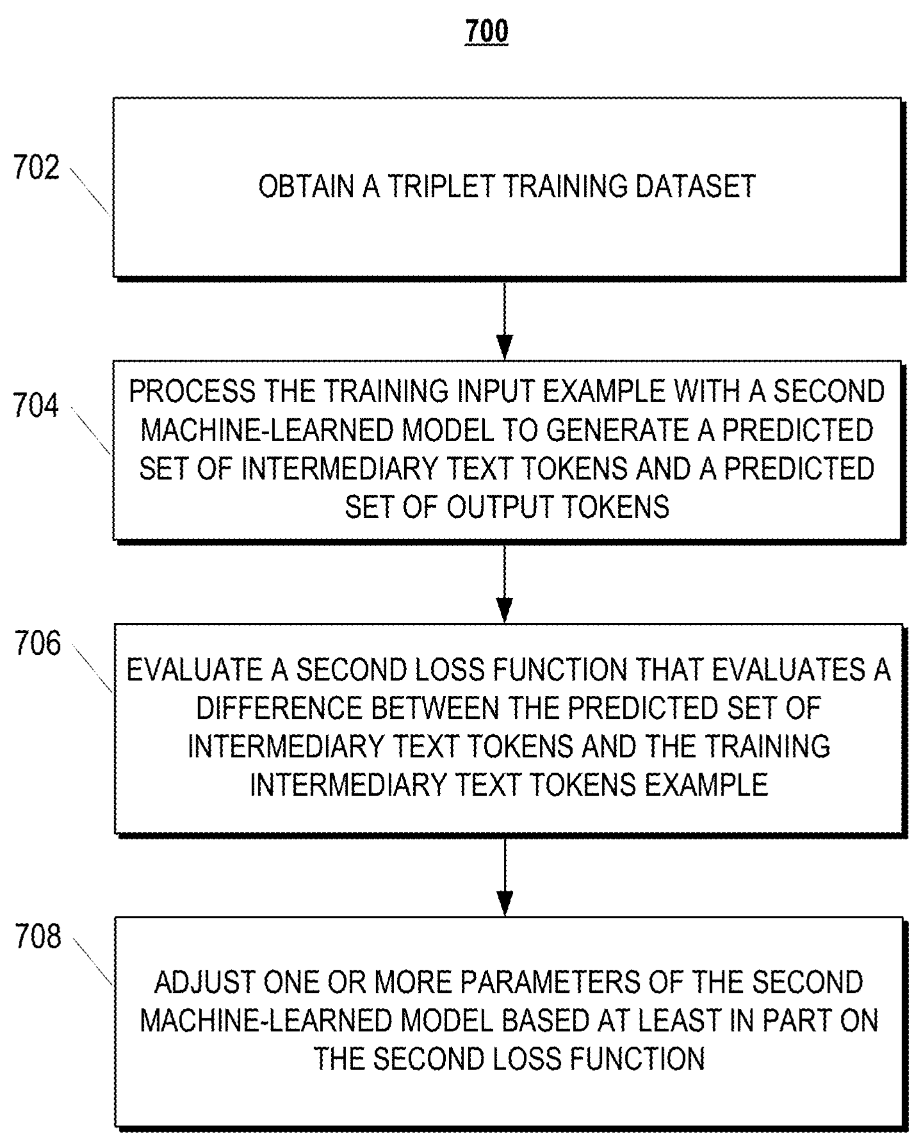
FIG. 7 depicts a flow chart diagram of an example method to perform chain-of-thought language model training according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a triplet training dataset. The triplet training dataset can include a first triplet training set. The first triplet training set can include a training input example, a training set of intermediary text tokens, and a training set of output text tokens. In some implementations, the training set of intermediary text tokens can include data descriptive of a set of intermediary text tokens generated by a first machine-learned model in response to processing the training input example. The first machine-learned model may have been trained on a first loss function that includes a combined gradient that can be based on a difference between a first gradient associated with a previously stored set of intermediary text tokens and a second gradient associated with a model inference rationale. The first machine-learned model may include one or more transformer models.

At 704, the computing system can process the training input example with a second machine-learned model to generate a predicted set of intermediary text tokens and a predicted set of output text tokens. The second machine-learned model can be a compact model. The second machine-learned model may be smaller than the first machine-learned model. The second machine-learned model may be trained and/or configured for a particular downstream task, while the first machine-learned model may be a general large language model tuned for chain-of-thought reasoning. The second machine-learned model may include one or more transformer models.

At 706, the computing system can evaluate a second loss function that evaluates a difference between the predicted set of intermediary text tokens and the training set of intermediary text tokens. In some implementations, the evaluation may be based on intermediary representations.

At 708, the computing system can adjust one or more parameters of the second machine-learned model based at least in part on the second loss function. Alternatively and/or additionally, one or more parameters of a soft prompt may be adjusted based on the second loss function.

Figure 8:
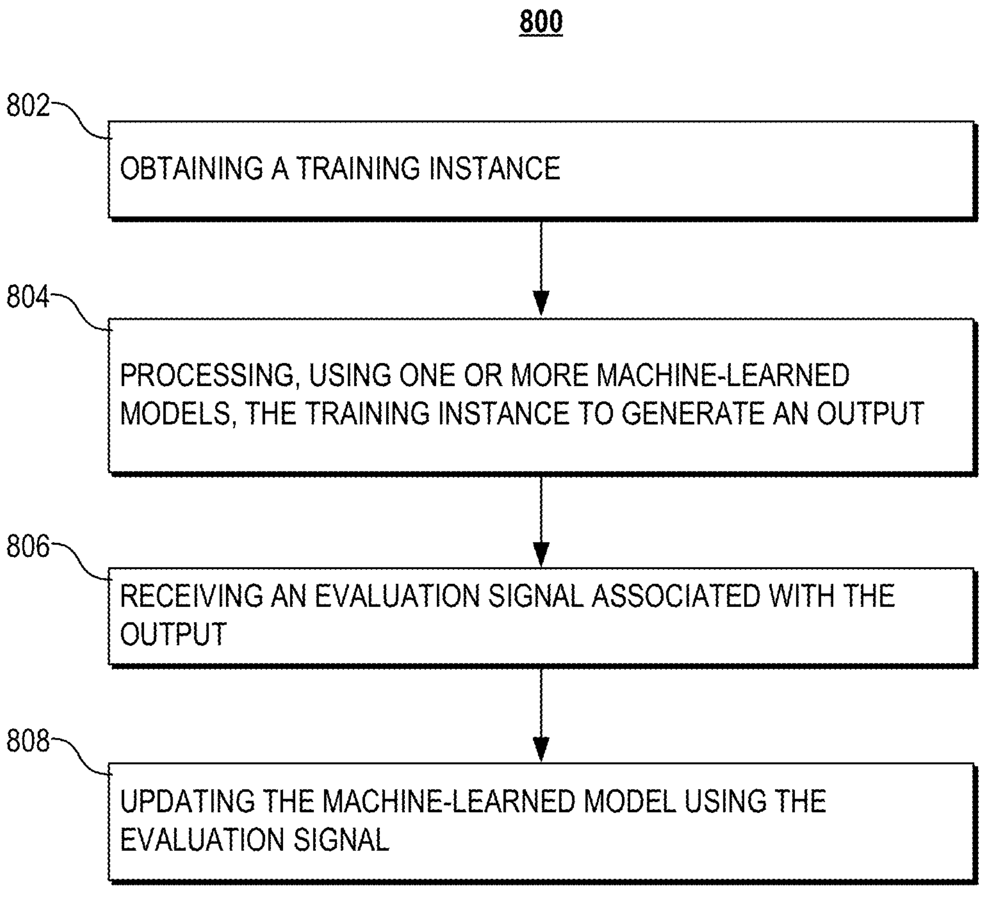
FIG. 8 depicts a flow chart diagram illustrating an example method for training a machine-learned model according to example implementations of aspects of the present disclosure.

FIG. 8 depicts a flowchart of a method 800 for training one or more machine-learned models according to aspects of the present disclosure. For instance, an example machine-learned model can include a machine-learned chain-of-thought language model.

One or more portion(s) of example method 800 can be implemented by a computing system that includes one or more computing devices such as, for example, computing systems described with reference to the other figures. Each respective portion of example method 800 can be performed by any (or any combination) of one or more computing devices. Moreover, one or more portion(s) of example method 800 can be implemented on the hardware components of the device(s) described herein, for example, to train one or more systems or models. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of example method 800 can be performed additionally, or alternatively, by other systems.

At 802, example method 800 can include obtaining a training instance. A set of training data can include a plurality of training instances divided between multiple datasets (e.g., a training dataset, a validation dataset, or testing dataset). A training instance can be labeled or unlabeled. Although referred to in example method 800 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 804, example method 800 can include processing, using one or more machine-learned models, the training instance to generate an output. The output can be directly obtained from the one or more machine-learned models or can be a downstream result of a chain of processing operations that includes an output of the one or more machine-learned models.

At 806, example method 800 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 808, example method 800 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 800 can include implementing a number of generalization techniques (e.g., weight decays, dropouts, etc.) to improve the generalization capability of the models being trained.

In some implementations, example method 800 can be implemented for training a machine-learned model from an initialized state to a fully trained state (e.g., when the model exhibits a desired performance profile, such as based on accuracy, precision, recall, etc.).

In some implementations, example method 800 can be implemented for particular stages of a training procedure. For instance, in some implementations, example method 800 can be implemented for pre-training a machine-learned model. Pre-training can include, for instance, large-scale training over potentially noisy data to achieve a broad base of performance levels across a variety of tasks/data types. In some implementations, example method 800 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Example Machine-Learned Models

Figure 9:
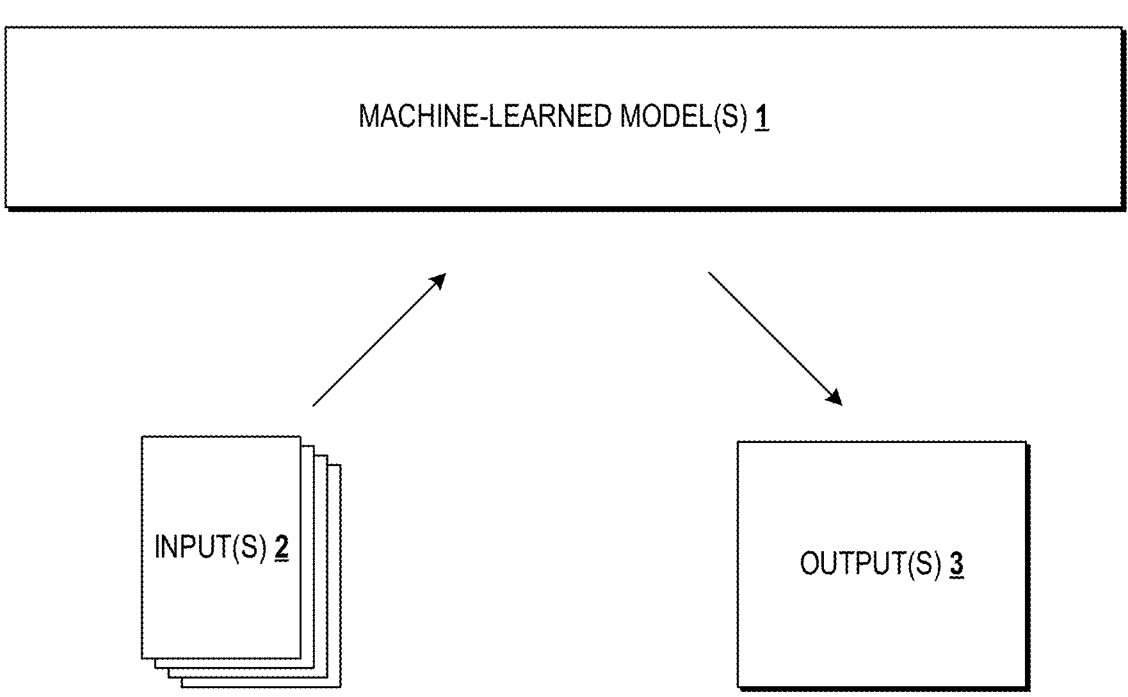
FIG. 9 depicts a block diagram of an example processing flow for using machine-learned model(s) to process input(s) to generate output(s) according to example implementations of aspects of the present disclosure.

FIG. 9 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Choice Routing*, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Example Machine-Learned Sequence Processing Models

Figure 10:
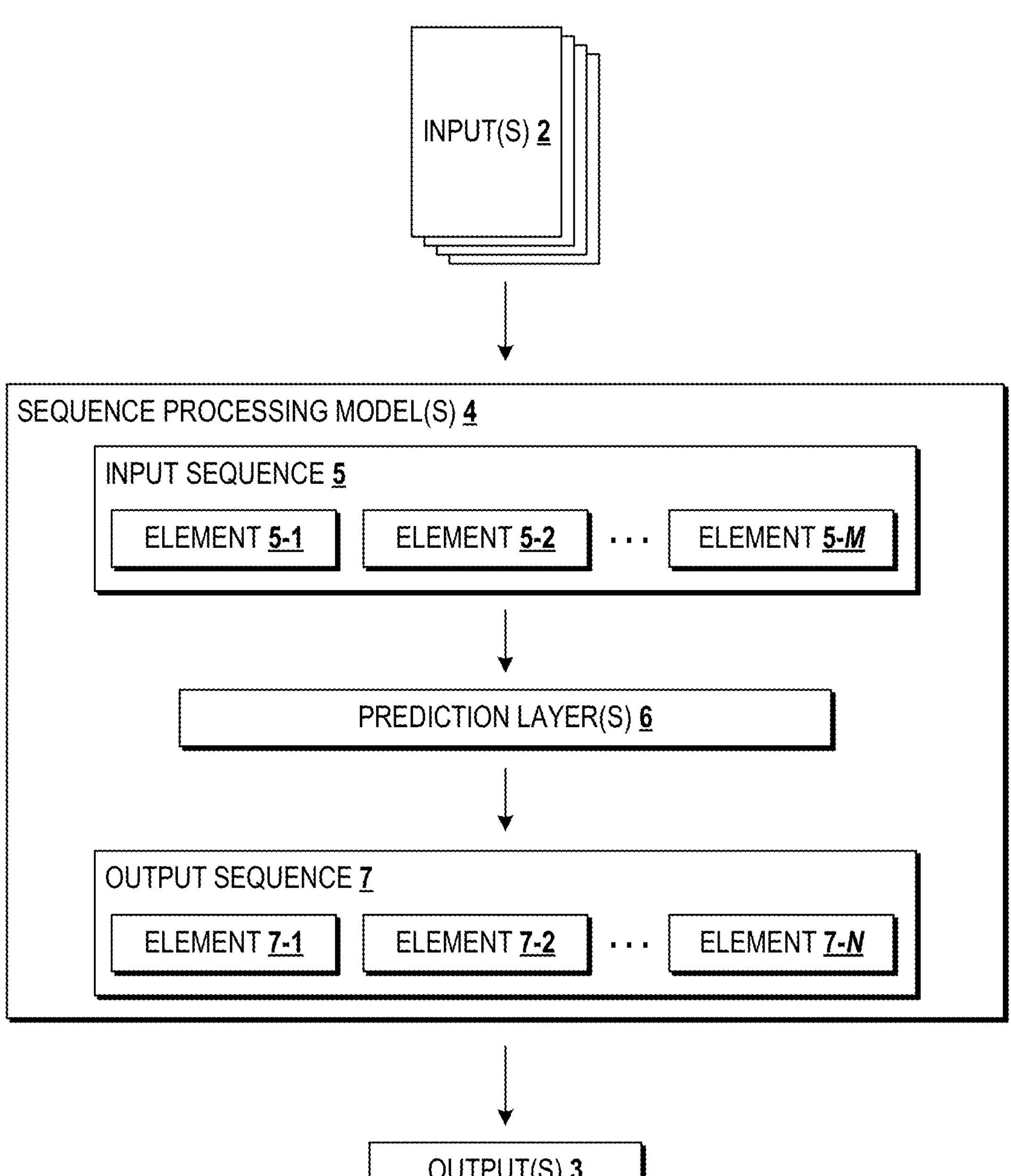
FIG. 10 depicts a block diagram of an example sequence processing model according to example implementations of aspects of the present disclosure.

FIG. 10 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source.

Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 10 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of ______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is All You Need*, arXiv: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, arXiv: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 11:
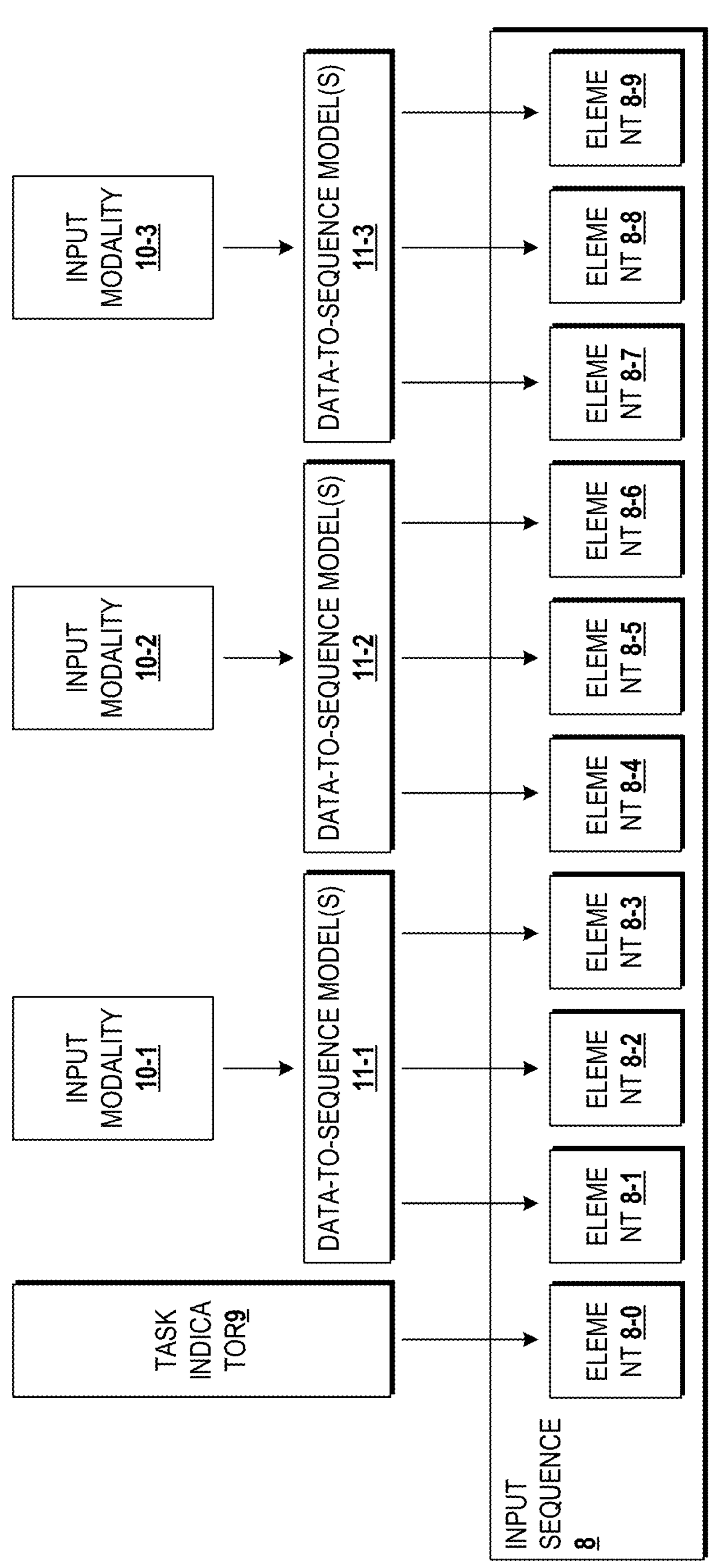
FIG. 11 depicts a block diagram of an example technique for populating an example input sequence for processing by a sequence processing model according to example implementations of aspects of the present disclosure.

FIG. 11 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Example Machine-Learned Model Development Platform

Figure 12:
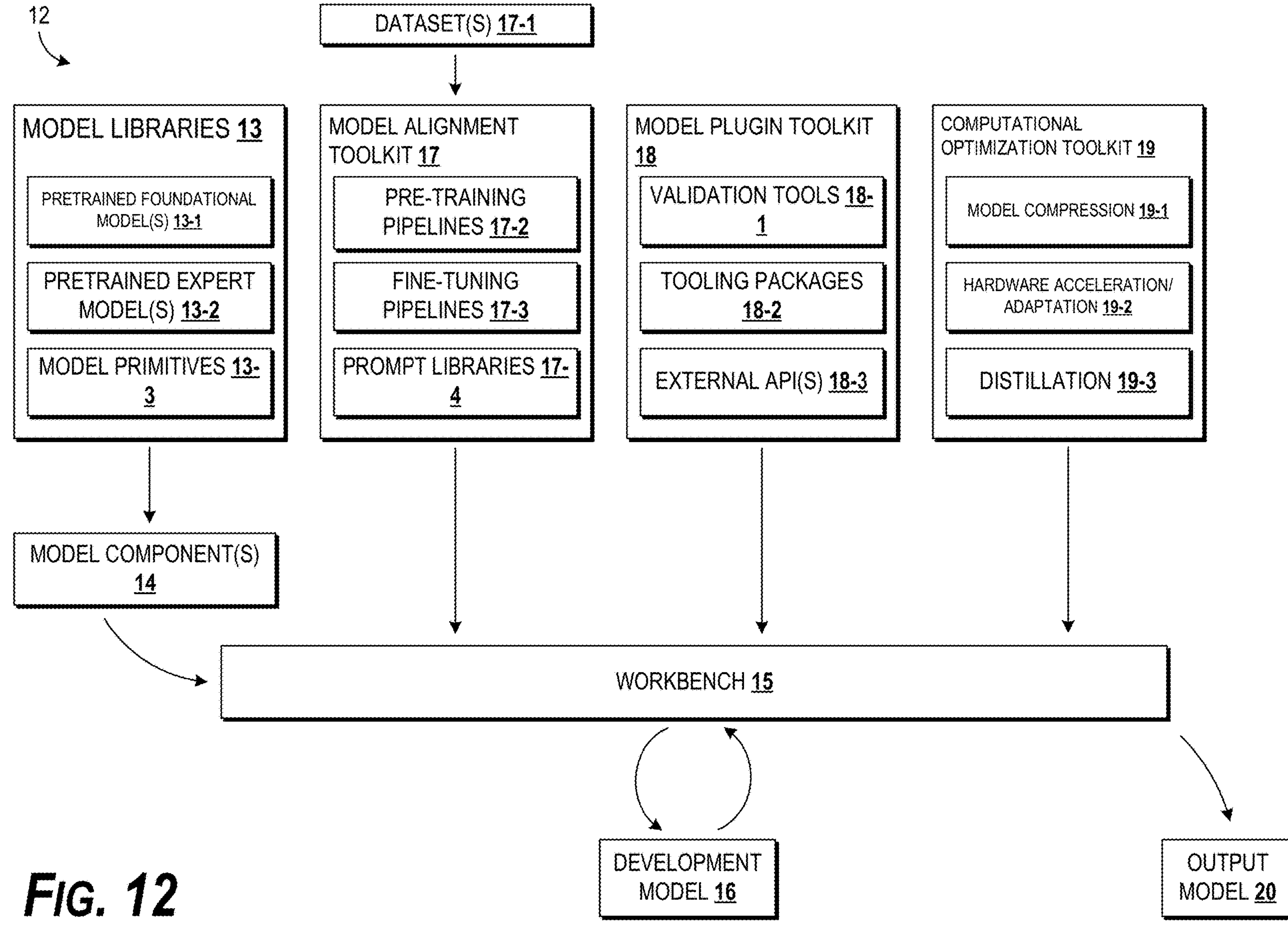
FIG. 12 depicts a block diagram of an example model development platform according to example implementations of aspects of the present disclosure.

FIG. 12 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 800 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 13:
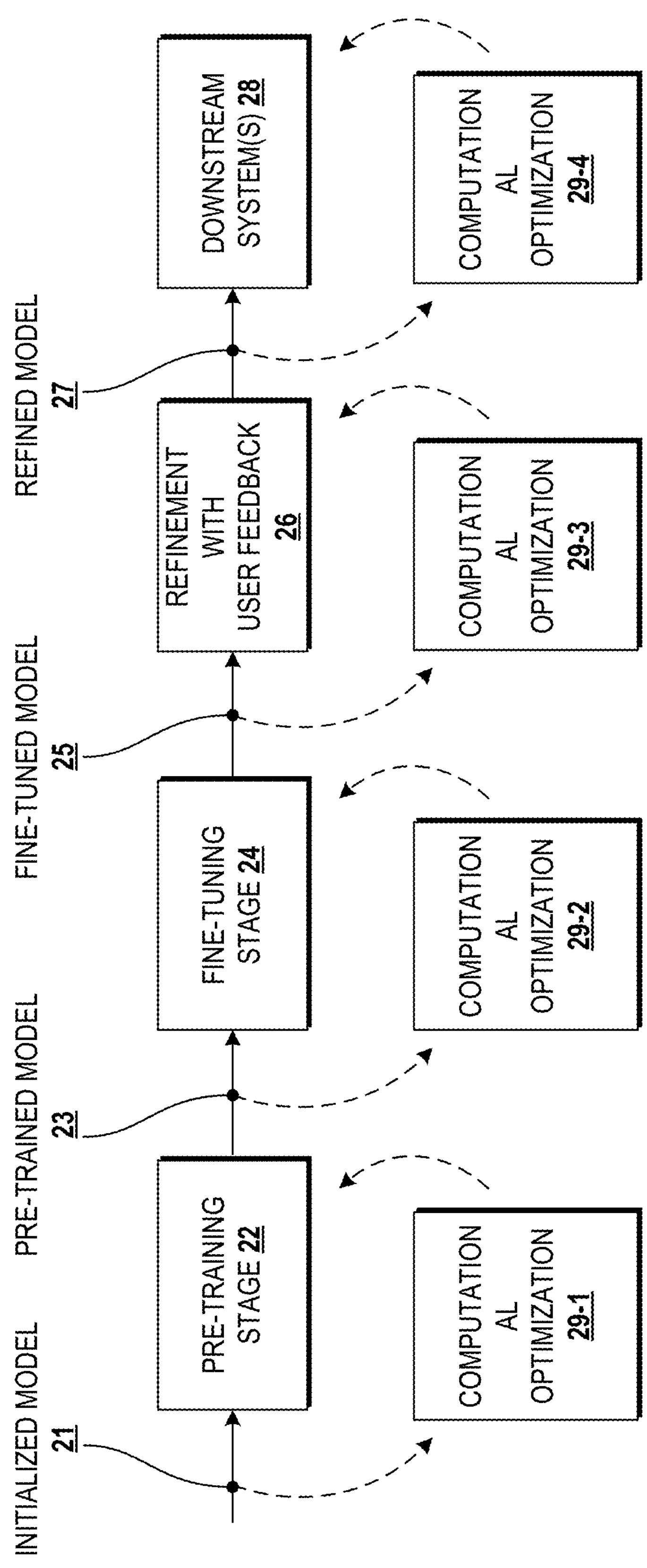
FIG. 13 depicts a block diagram of an example training workflow for training a machine-learned model according to example implementations of aspects of the present disclosure.

FIG. 13 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Example Machine-Learned Model Inference System

Figure 14:
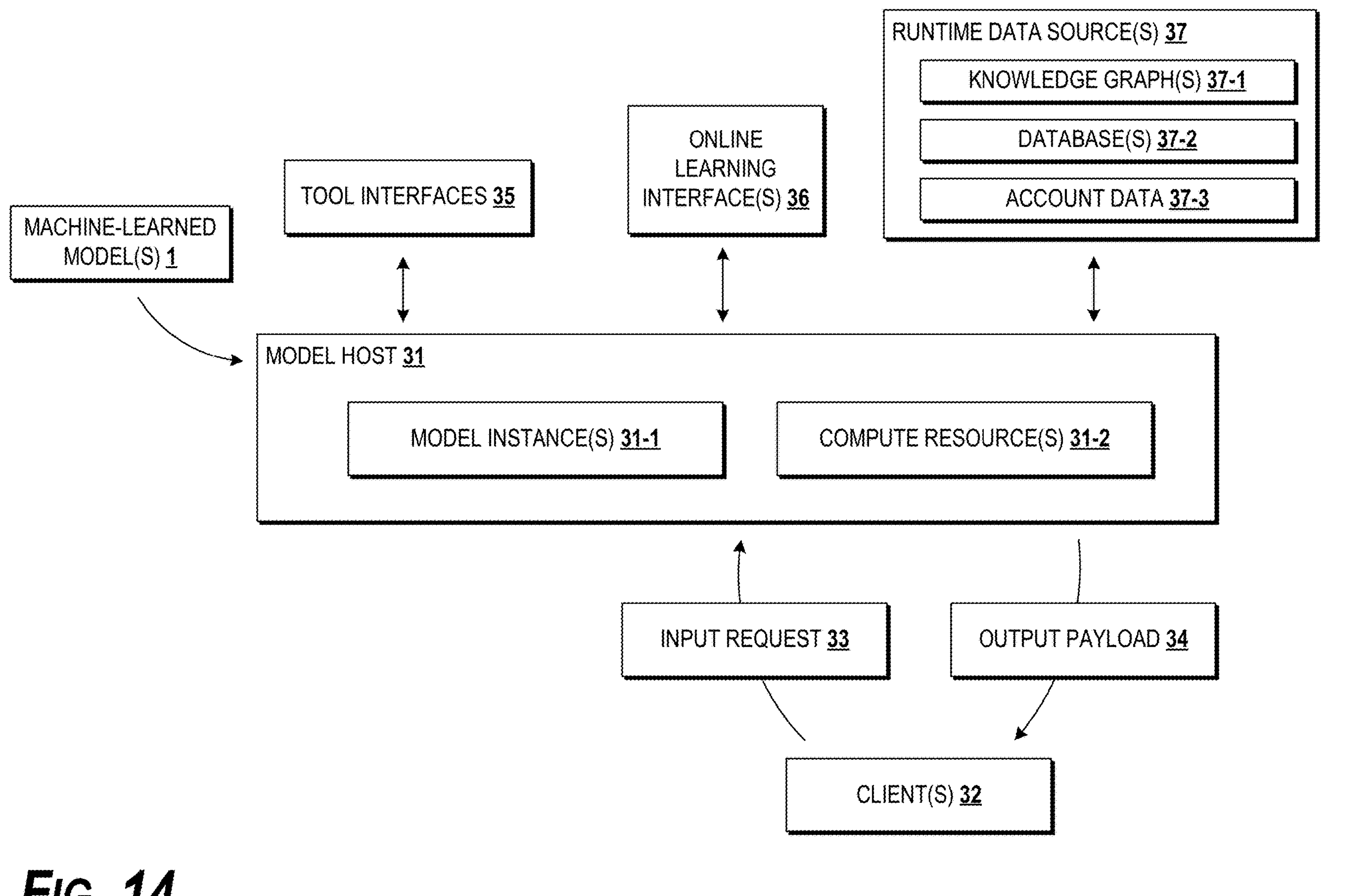
FIG. 14 depicts a block diagram of an inference system for operating one or more machine-learned model(s) to perform inference according to example implementations of aspects of the present disclosure.

FIG. 14 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored on/in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also share model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) I can process the speech data to generate a speech recognition output. As another example, machine-learned model(s) I can process the speech data to generate a speech translation output. As another example, machine-learned model(s) I can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) I can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) I can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) I can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) I can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may include compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Example Computing Systems and Devices

Figure 15:
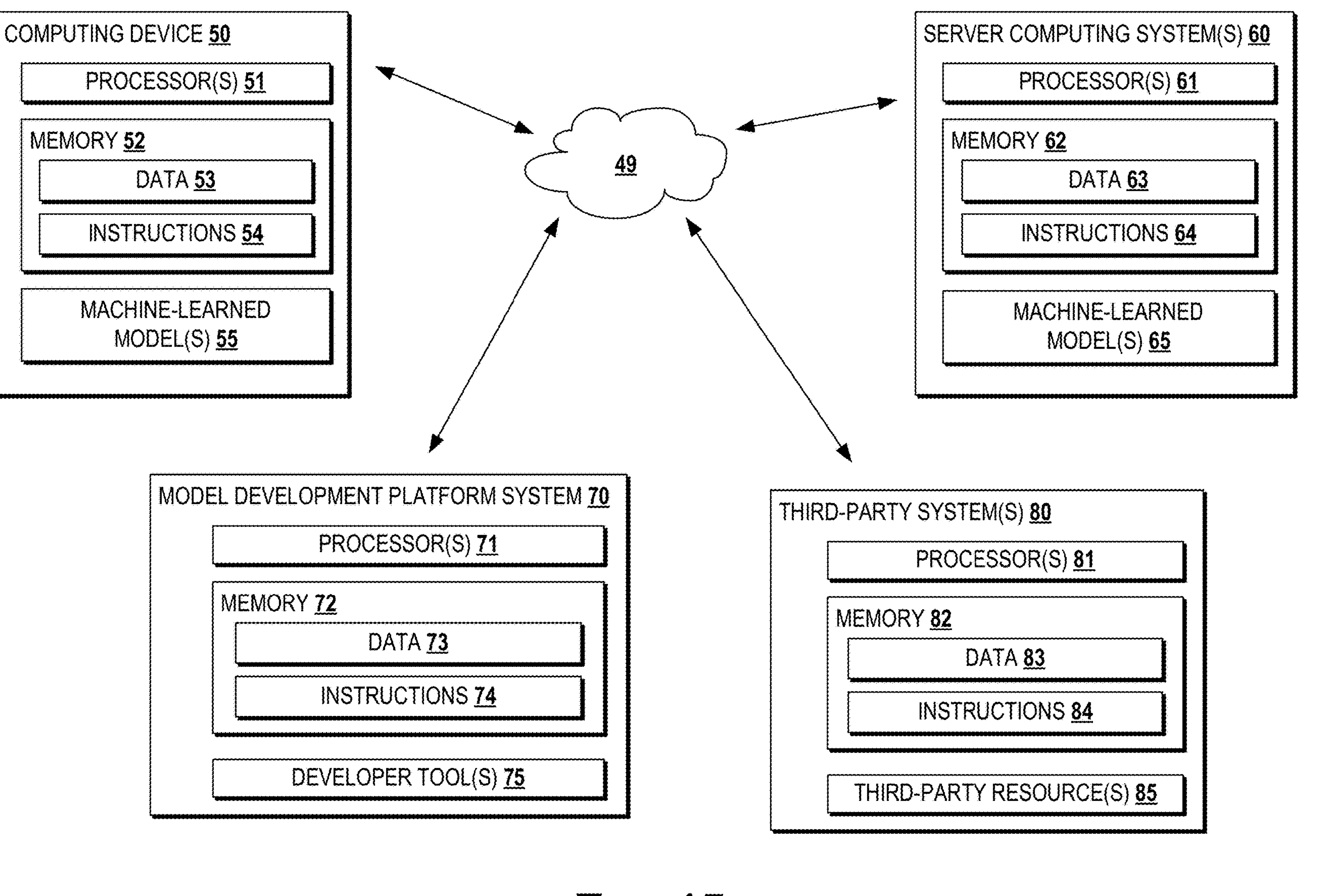
FIG. 15 depicts a block diagram of an example networked computing system according to example implementations of aspects of the present disclosure.

FIG. 15 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 15 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 15 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 16:
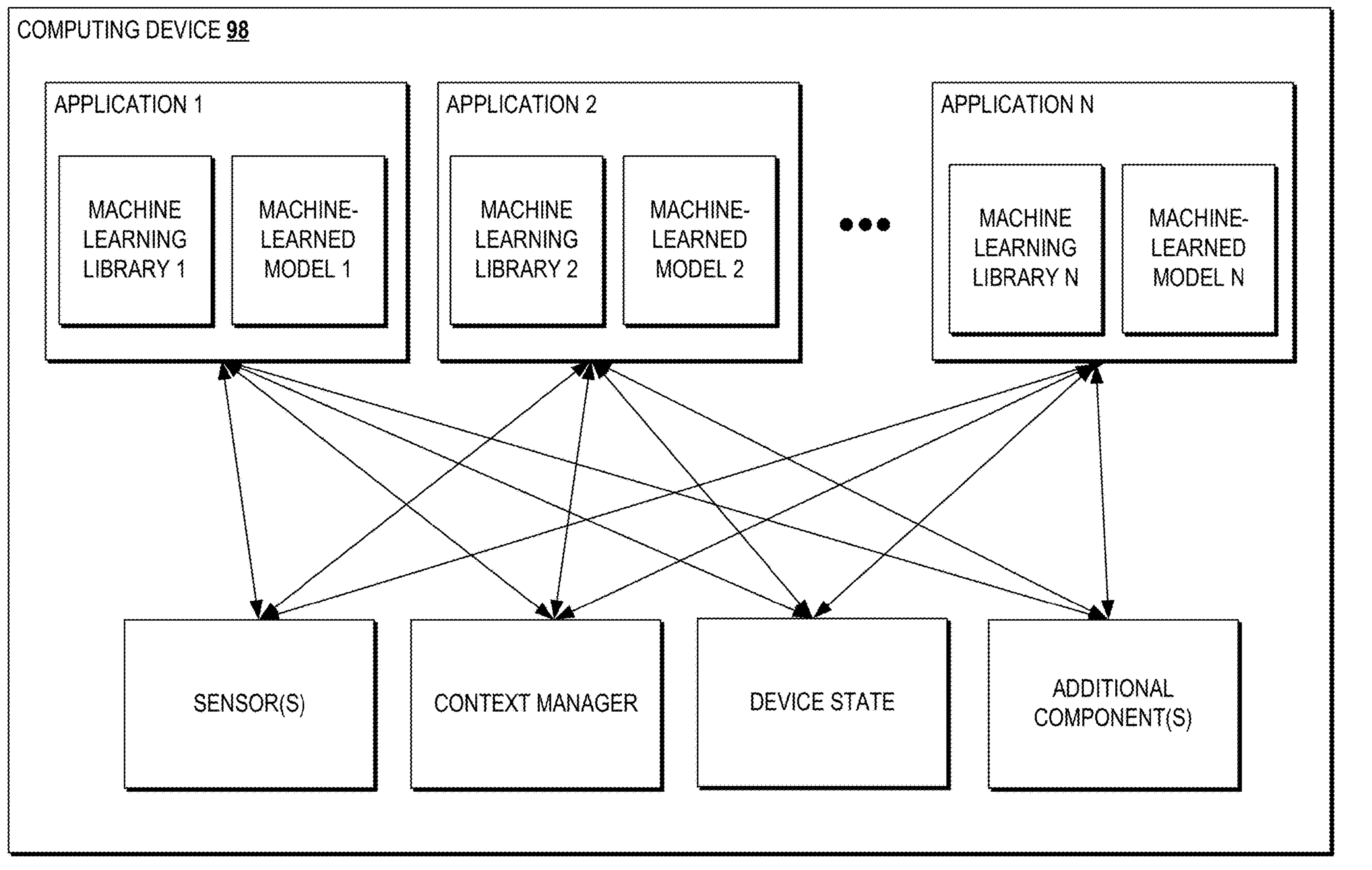
FIG. 16 depicts a block diagram of an example computing device according to example implementations of aspects of the present disclosure.

FIG. 16 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 16, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 17:
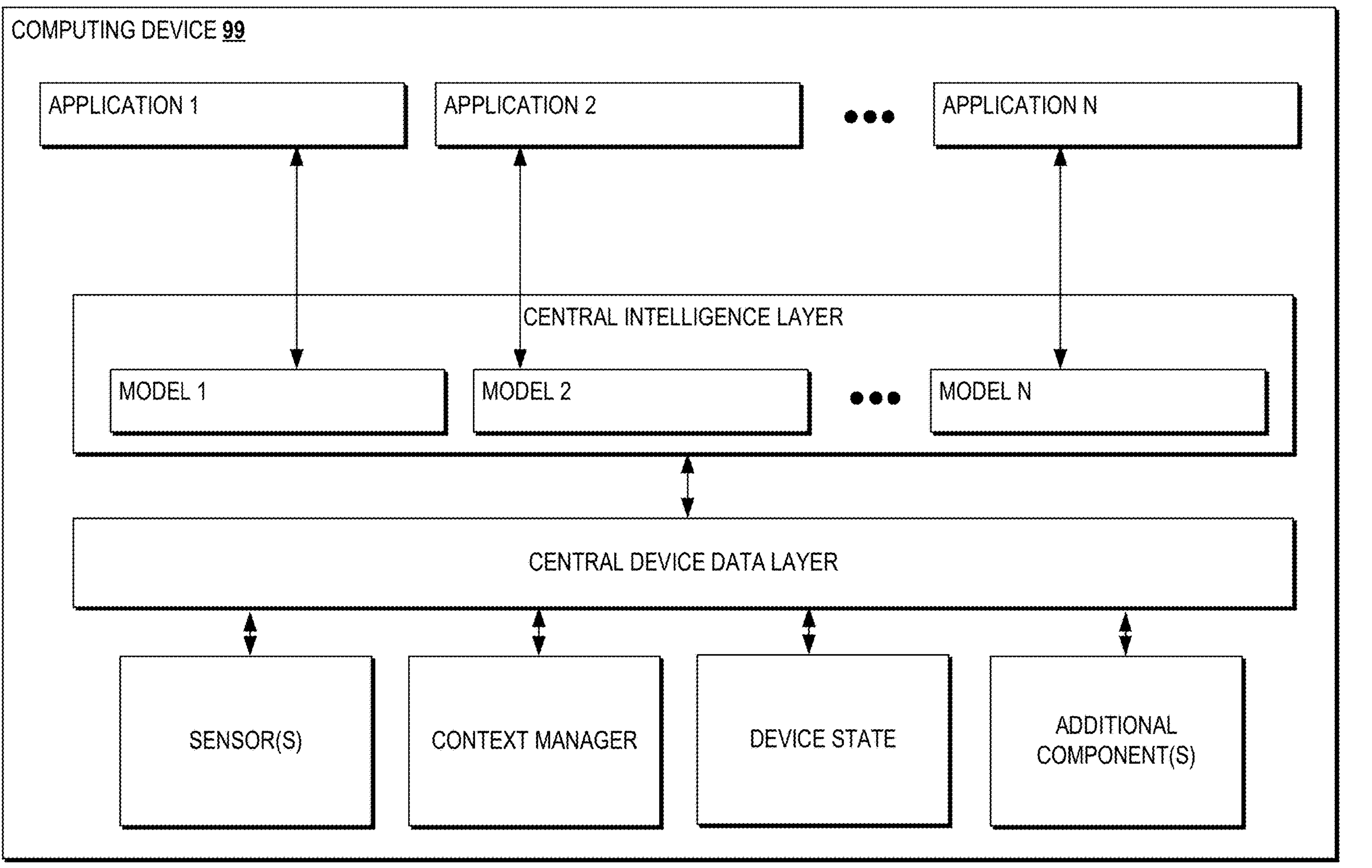
FIG. 17 depicts a block diagram of an example computing device according to example implementations of aspects of the present disclosure.

FIG. 17 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 17, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 17, the central device data layer can communicate with a number of other components of the computing device, such as, for example, one or more sensors, a context manager, a device state component, or additional components. In some implementations, the central device data layer can communicate with each device component using an API (e.g., a private API).

Example Implementations and Experiments

Large language models (LLMs) can solve problems more accurately when instructed to work out the answer step by step using a "chain-of-thought" (CoT) prompt. Additionally and/or alternatively, the performance of language models may be improved on a specific task by supervised fine-tuning (e.g., by using gradient ascent on some tunable parameters to maximize the average log-likelihood of correct answers from a labeled training set). Combining chain-of-thought prompting with supervised tuning can include supervision not just of the correct answers, but also of detailed rationales that lead to those answers. The rationales can be expensive to produce by hand. Therefore, the systems and methods disclosed herein may include a fine-tuning strategy that attempts to maximize the marginal log-likelihood of generating a correct answer using chain-of-thought prompting, approximately averaging over all possible rationales. The systems and methods can sample from the posterior over rationales (and/or intermediary text tokens) conditioned on the correct answer, which may include using a simple Markov-chain Monte Carlo (MCMC) expectation-maximization (EM) process (which may include a self-taught reasoner, memorized wake-sleep, Markovian score climbing, and/or persistent contrastive divergence). The process can include a control-variate technique that drives the variance of a gradient that estimates to zero as the model improves. The MCMC-EM fine-tuning technique can improve the model's accuracy on held-out examples more than STaR or prompt-tuning with or without chain-of-thought.

For some mathematical, logical, and common-sense reasoning problems, large language models can solve problems more accurately when instructed to work out the answer step by step in a chain of thought or a scratchpad. The chain-of-thought processing can encourage the model to produce a set of intermediary text tokens (e.g., text describing a sequence of reasoning steps that leads to an answer).

The systems and methods can fine-tune models to generate logical and accurate rationales. Sets of intermediary text tokens can be obtained via crowdsourcing and/or automatically. The sets of intermediary text tokens can then be utilized for supervised and/or unsupervised training. In some implementations, the training can include generating a training dataset by obtaining datasets that include questions and correct answers only, which may be more readily available, and can bootstrap sets of intermediary text tokens during learning. The bootstrapping may include utilization of a self-taught reasoner (STaR) (e.g., the reasoner discussed in Zelikman et al., "Star: Bootstrapping reasoning with reasoning," arXiv, (Mar. 28, 2022), https://arxiv.org/abs/2203.14465.), which can generate proposed sets of intermediary text tokens from an LLM, and can then fine-tune the model on sets of intermediary text tokens that lead to the correct result (e.g., the correct answer).

The systems and methods can include utilizing one or more probabilistic latent-variable models. The language model (e.g., a large language model) can learn a joint probability distribution over questions, rationales, and answers. The joint distribution can include a marginal distribution of answers given questions, averaging over all possible sets of intermediary text tokens (e.g., all possible rationales) weighted by their probability given the question. The problem of self-training for reasoning can then become one of learning with incomplete data, which can be a core task in probabilistic machine learning.

In some implementations, computing the marginal distribution can include averaging over a vast set of potential rationales. The systems and methods disclosed herein can include a learning technique (e.g., a technical process, a pipeline, and/or an algorithm) for intermediary text token generation (e.g., rationale generation), which can be denoted as tuning rationales with independence-chain expectation-maximization (TRICE). Tuning rationales with independence-chain expectation-maximization (TRICE) can include a Markov-chain Monte Carlo (MCMC) expectation-maximization (EM) algorithm combined with a control-variate scheme.

The TRICE configuration can provide an alternative interpretation of STaR as a kind of biased stochastic expectation-maximization algorithm that underweights difficult examples when its rationalization process fails. Self-consistency can be seen as a Monte Carlo algorithm for computing the most likely answer under the marginal distribution. Compared to self-consistency, the probabilistic learning approach of TRICE can allow the system to average over sets of intermediary text tokens (e.g., rationales) not only at inference time, but also at training time.

The chain-of-thought language model may be trained on the GSM8K dataset (Cobbe et al. "Training verifiers to solve math word problems," arXiv (Oct. 27, 2021), https://arxiv.org/abs/2110.14168.) and/or may utilize the BIG-Bench Hard benchmark (Suzgun et al. "Challenging big-bench tasks and whether chain-of-thought can solve them," arXiv (Oct. 17, 2022), https://arxiv.org/abs/2210.09261.). Experiments can show that TRICE improves the model's performance significantly, can outperform models tuned with STaR, direct tuning with or without CoT, and supervised fine-tuning on human-generated rationales.

Given a training set of N questions $x_{1:N}$ and answers $y_{1:N}$, the chain-of-thought tuning can optimize a parameter vector $\theta$ to maximize the average marginal log-likelihood of answers given questions:

$$\mathcal{L}(\theta)\Delta = \frac{1}{N}\sum_n \log p_\theta(y_n|x_n) = \frac{1}{N}\sum_n \log \sum_z p_\theta(z|x_n)p(y_n|z, x_n), \tag{1}$$

where z is an unobserved latent rationale, $p_\theta(z|x)$ is the probability of obtaining the set of intermediary text tokens z by prompting an LLM with the question x and tunable parameters $\theta$, and $p_\theta(y|z,x)$ is the probability of obtaining the answer y given set of intermediary text tokens z, question x, and parameters $\theta$. The models can have a configuration with the likelihood $p_\theta(y|x,z)\in\{0,1\}$, where the answer y is a deterministic function of z. For example, the model's answer can then be y="(a)" if z ends with the string "The answer is (a)." For the deterministic model, the system can define $p(y|z,x)=c(z,y)\in\{0,1\}$. A binary likelihood model may be utilized for question-answering tasks where z is a rationale. A good set of intermediary text tokens may leave no ambiguity about the correct answer. The derivations below may assume a binary likelihood function. The methods may generalize to cases where the relationship between z and y is weaker and therefore $p(y|x,z)$ is more complicated.

The system can initialize a memory containing a latent set of intermediary text tokens $z_n$ for each example pair $x_n$, $y_n$ by sampling $z_n$ from a hinted guide distribution $q(z|x_n,y_n)$ that may condition on the correct answer $y_n$ as well as the question $x_n$. For example, the guide may prompt an LLM specifically to give a set of intermediary text tokens for the answer. In some cases, sampling from the guide instead of the model $p_\theta(z|x_n)$ can increase the chances of generating a correct rationale.

The system can then proceed to the main optimization loop. Each iteration, the system can sample a minibatch of M questions and answers from the dataset and can retrieve the sets of intermediary text tokens associated with those examples from the memory. The system can then propose new sets of intermediary text tokens $\tilde{z}$ from the current model $p_\theta(z|x)$, and whenever the new set of intermediary text tokens $\tilde{z}$ is correct (i.e., $c(\tilde{z}, y)=1$), the system can replace the old set of intermediary text tokens in memory with the new one.

The system can then compute a gradient estimate. For example, the system can average the gradients $\nabla_\theta \log p_\theta(z_{i_m}|x_{i_m})$ that are obtained from those sets of intermediary text tokens in the updated memory that are correct (e.g., ignore examples where both the proposed set of intermediary text tokens and the previous set of intermediary text tokens were wrong).

In some implementations, the system can reduce the variance of the gradient estimator by incorporating a control variate, as in control_variate_gradient_estimate. The system can first compute leave-one-out estimates $\beta_{1:M}$ of the average probability of accepting a new rationale. For each example m, the system can subtract off a scaled control variate $\beta_m \nabla_\theta \log p_\theta(\tilde{z}_m|x_{i_m})$ whose expected value is zero (since it is a score function). If the proposed set of intermediary text tokens $\tilde{z}_m$ for example m is correct, then $z_{i_m}=\tilde{z}_m$, and the mth gradient contribution can become $(1-\beta_m)\nabla_\theta \log p_\theta(z_{i_m}|x_{i_m})$ (e.g., the gradient contribution can be scaled down by $1-\beta_m$). If $\tilde{z}_m$ is incorrect, then the system can adjust the gradient estimate to try to make $\tilde{z}_m$ less likely under $p_\theta$. As the model becomes more accurate (e.g., $\beta$ gets closer to 1), the system can give more weight to incorrect sets of intermediary text tokens (when they occur) and less weight to correct rationales.

---

Process 1: TRICE

Input: Generative model $p_\theta(z, y|x)$, is-correct function $c(z, y)$, dataset $x_{1:N}$, $y_{1:N}$, hinted guide distribution $q(z|x, y)$, initial parameters $\theta$, optimizer update function $h(\theta, g, t)$, minibatch size M, gradient minibatch size L, number of iterations T.

Output: Tuned parameters $\theta$, sets of intermediary text tokens $z_{1:N}$.

(1) for $n \in 1, \ldots, N$ do (in parallel) // Initialize Markov chain states.

(2) Sample $z_n$ from $q(z|x_n, y_n)$. // Sample "fallback" set of intermediary text tokens from guide q.

(3) end for (4) for $t \in 1, \ldots, T$ do // Main optimization loop.

(5) Get next minibatch of M indices $i_{1:M}$ into the dataset.

(6) for $m \in 1, \ldots, M$ do (in parallel) // Take one MCMC step to update Markov chain states.

(7) Sample $\tilde{z}_m$ from $p_\theta(z|x_{i_m})$.

(8) if $c(\tilde{z}_m, y_{i_m})$ // Accept or reject proposal.

(9) Update $z_{i_m} \leftarrow \tilde{z}_m$.

(10) end if

(11) Let $\tilde{c}_m = c(\tilde{z}_m, y_{i_m})$. // Whether the proposal is correct.

(12) Let $c_m' = c(z_{i_m}, y_{i_m})$. // Whether the updated set of intermediary text tokens is correct.

(13) end for

(14) Compute $\hat{g}$ using either basic_gradient_estimate(z, x, c'), control_variate_gradient_estimate(z, x, $\tilde{z}$, $\tilde{c}$, c'), or subsampled_control_variate_gradient_estimate(z, x, $\tilde{z}$, $\tilde{c}$, c').

(15) Update $\theta \leftarrow h(\theta, \hat{g}, t)$. // Apply gradient update.

(16) end for

(17) return $\theta$, $z_{1:N}$.

(18) procedure basic_gradient_estimatez, x, c'

(19) return $\frac{1}{\sum_m c'_m} \sum_m c'_m \nabla_\theta \log p_\theta(z_{i_m}|x_{i_m})$.

(20) end procedure

(21) procedure control_variate_gradient_estimatez, x, $\tilde{z}$, $\tilde{c}$, c'

(22) for $m \in 1, \ldots, M$ do (in parallel)

(23) Set $\beta_m = \frac{\sum_{m' \neq m} c'_{m'} \tilde{c}_{m'}}{\sum_{m' \neq m} c'_{m'}}$. // Compute leave-one-out control-variate scales.

(24) end for

(25) return $\frac{1}{\sum_m c'_m} \sum_m c'_m (\nabla_\theta \log p_\theta(z_{i_m}|x_{i_m}) - \beta_m \nabla_\theta \log p_\theta(\tilde{z}_m|x_{i_m}))$.

(26) end procedure

(27) procedure subsampled_control_variate_gradient_estimatez, x, $\tilde{z}$, $\tilde{c}$, c'

(28) for $m \in 1, \ldots, M$ do (in parallel)

(29) Set $\beta_m = \frac{\sum_{m' \neq m} c'_{m'} \tilde{c}_{m'}}{\sum_{m' \neq m} c'_{m'}}$. // Compute leave-one-out control-variate scales.

(30) Set $\tilde{w}_m = c_m' (1 - \tilde{c}_m \beta_m)$, // Compute unnormalized weights for subsampling.

$\tilde{w}_{M+m} = c_m' (1 - \tilde{c}_m) \beta_m$.

(31) end for

-continued

(32) Choose a subset of L indices $j_{1:L}$ using systematic resampling with probabilities $\frac{\tilde{w}}{\sum_{m=1}^{2M} \tilde{w}_m}$.

(33) for $\ell \in 1, \ldots, L$ do (in parallel)
(34) if $j_\ell \leq M$ then // Selected correct set of intermediary text tokens.
(35) Let $\hat{m} = j_\ell$, $\hat{z} = z_{i\hat{m}}$, $s = 1$.
(36) else // Selected incorrect set of intermediary text tokens.
(37) Let $\hat{m} = j_\ell$, M, $\hat{z} = \tilde{z}_m$, $s = -1$.
(38) end if
(39) Compute $\hat{g}_\ell = s\nabla_\theta \log p_\theta(\hat{z}|x_{i\hat{m}})$. // Negate gradient if $\ell$th set of intermediary text tokens is incorrect.
(40) end for

(41) return $\frac{\sum_{m=1}^{2M} \tilde{w}_m}{\sum_m c'_m} \frac{1}{L} \sum_{\ell=1}^{L} \hat{g}_\ell$.

(42) end procedure control_variate_gradient_estimate can be more expensive than basic_gradient_estimate, since the system may compute gradients not only for the sets of intermediary text tokens in memory but also for any incorrect sets of intermediary text tokens the system generates. This may be wasteful, if many of the weights on those gradients ($1-\beta$ for correct proposals, $\beta$ for incorrect proposals) are close to zero, because $\beta$ may be close to zero or one. To reduce this cost, in subsampled_control_variate_gradient_estimate, the system may use systematic resampling to generate a subsample of L question-set of intermediary text tokens pairs, from which the system may obtain an unbiased estimate of the output of control_variate_gradient_estimate. In some implementations, the system may preferentially sample gradients with higher scalar weights. For example, if $\beta$ is small, the system may be less likely to sample incorrect sets of intermediary text tokens (which have weight $\beta$), and if $\beta$ is large, the system may be less likely to sample correct proposed sets of intermediary text tokens (which have weight $1-\beta$).

The variance-reduced stochastic MCMC-EM procedure may be derived as follows.

The gradient ("true gradient") of the marginal log-likelihood $\log p_\theta(y|x)$ with respect to $\theta$ can be $$\nabla_\theta \log \sum_z p_\theta(z, y|x) = \sum_z \frac{p_\theta(z, y|x)\nabla_\theta \log p_\theta(z, y|x)}{\sum_{z'} p_\theta(z', y \mid x)} = \sum_z p_\theta(z|x, y)\nabla_\theta \log p_\theta(z|x). \quad (2)$$

For example, the expectation can be with respect to the posterior $p_\theta(z|x,y)$ of the gradient of the conditional log-prior $\log p_\theta(z|x)$, since the likelihood $p(y|z,x)=c(z,y)$ may not depend on $\theta$. If the system samples from the posterior over sets of intermediary text tokens z conditioned on the question-answer pair x, y, then the system can compute an unbiased estimate of the gradient of the marginal log-likelihood $\log p_\theta(y|x)$. The system can interpret this as "bootstrapping" sets of intermediary text tokens z that are consistent with both the prior on sets of intermediary text tokens $p_\theta(z|x)$ and the observed answer y.

The system can include an independence sampler for $p_\theta(z|x,y)$.

The system may not directly sample from $p_\theta(z|x,y)$. The system can then leverage Markov chain Monte Carlo (MCMC) expectation maximization. The system can maintain a memory memorized wake sleep of a single set of intermediary text tokens $z_n$ for each question-answer pair $x_n$, $y_n$, and each iteration, the system may apply a random update to $z_n$ that leaves the posterior $p_\theta(z_n|x_n,y_n)$ invariant training. Each MCMC update can bring the $z_n$'s closer in distribution to $p_\theta(z_n|x_n,y_n)$. Updates to $\theta$ may change the posterior $p_\theta(z_n|x_n,y_n)$. In some implementations, the system may update the chains to control the bias of the gradient estimates.

To update the chains, the system may use a hyperparameter-free independence sampler. Additionally and/or alternatively, the system can update the current state z with a draw $\tilde{z}$ from a distribution $r_{x,y}$ that does not depend on z, and can accept the update with probability $$\alpha(\tilde{z} \mid z) = \min\left\{1, \frac{p_\theta(\tilde{z}, y|x) / r_{x,y}(\tilde{z})}{p_\theta(z, y|x) / r_{x,y}(z)}\right\}.$$

The system may choose $r_{x,y}(z)=p_\theta(z|x)$, which simplifies the acceptance probability to $$\alpha(\tilde{z} \mid z) = \min\left\{1, \frac{p_\theta(y|x, \tilde{z})}{p_\theta(y|x, z)}\right\}.$$

The simplification can be 1 if $c(\tilde{z},y)=1$, 0 if $c(\tilde{z},y)=0$ and $c(z,y)=1$, and ill-defined (implying rejection) if both $c(z,y)=0$ and $c(\tilde{z},y)=0$. In some implementations, the system can accept whenever the proposal $\tilde{z}$ is correct and reject otherwise.

Independence samplers may be understood as importance samplers that spread the work of generating and evaluating proposals over time. The update may attempt to sample from the posterior by rejection sampling, then falling back on an old sample if that fails. The expected number of iterations between successful updates can be $p(y|x)^{-1}$, which can include mixing, which may be faster for easier questions x, and may be accelerated as the model improves.

The system may include a basic gradient estimator. The MCMC/rejection-sampling procedure can approximate the gradient of the marginal log-likelihood. Denoting as z the state of the Markov chain for an example x, y before the update, the system can sample a proposal $\tilde{z}$ from $p_\theta(z|x)$, accept the new state if it is correct (i.e., if $c(\tilde{z},y)=1$), and can compute the gradient of the log-probability of the result:

$$z' = c(\tilde{z}, y)\tilde{z} + (1 - c(\tilde{z}, y))z;\ \hat{g} = \nabla_\theta \log p_\theta(z'|x);\ \mathbb{E}_{z,\tilde{z}}[\hat{g}|\theta] \approx \mathbb{E}_{p_\theta(z|x,y)}[\nabla_\theta \log p_\theta(z|x)], \tag{3}$$

where $\mathbb{E}_{z,\tilde{z}}[\cdot|\theta]$ denotes an expectation with respect to both the proposal $\tilde{z}$ and the previous state Z.

The estimate may have low bias if the distribution of z' is close to the posterior p(z|x,y), which can be expected to be true if the chain is mixing quickly enough relative to how fast θ is changing. This may happen if either the probability of getting a correct answer is high, or if θ is changing slowly due to a small learning rate and/or gradient. If the model's training-set accuracy may improve with training and the system can use a decaying learning-rate schedule, then as training proceeds both of the factors may work to reduce the bias of the gradient estimate.

The system may include adding a control variate. The mean of an estimator $\hat{g}$ may not be affected by subtracting a zero-mean random variable b from mean. If b is positively correlated with $\hat{g}$, then $\hat{g}-b$ may have lower variance than $\hat{g}$, and b can be used as a "control variate". Since, by the score-function identity, $\mathbb{E}_{p_{z|x}}[\beta\nabla_\theta \log p_\theta(z|x)]=0$ (for any scalar β independent of z), the system can use the proposed samples $\tilde{z}$ to generate control variates for the gradient estimator:

$$\begin{aligned}\mathbb{E}_{z,\tilde{z}}[\hat{g}\mid\theta] &= \mathbb{E}_z[\mathbb{E}_{\tilde{z}}[\nabla_\theta \log p_\theta(z'\mid x)]\mid\theta] \\ &= \mathbb{E}_z[\mathbb{E}_{\tilde{z}}[\nabla_\theta \log p_\theta(z'\mid x) - \beta\nabla_\theta \log p_\theta(\tilde{z}\mid x)]\mid\theta].\end{aligned} \tag{4}$$

In some implementations, the value of the estimator may depend on whether or not the system accepts the proposal $\tilde{z}$:

$$\nabla_\theta \log p_\theta(z'\mid x) - \beta\nabla_\theta \log p_\theta(\tilde{z}\mid x) = \begin{cases}(1-\beta)\nabla_\theta \log p_\theta(z'\mid x) & \text{if } \tilde{c}=1, \\ \nabla_\theta \log p_\theta(z'\mid x) - \beta\nabla_\theta \log p_\theta(\tilde{z}\mid x) & \text{if } \tilde{c}=0\end{cases}, \tag{5}$$

where the shorthand may be denoted as $\tilde{c} \triangleq c(\tilde{z},y)$.

The control variate can drive the variance of the gradient estimator to zero as the model converges to perfect accuracy on the training set. If the system sets β=π, where π is the probability of a correct answer (i.e., that $\tilde{c}=1$), then as π gets large, most of the time $\tilde{c}=1$, the system may multiply the gradient estimator by 1−π (multiplying its variance by a factor of $(1-\pi)^2$). If $\tilde{c}=0$, then the system may use of both a correct and incorrect set of intermediary text tokens. The weights attached to the updates may not be small, but if incorrect sets of intermediary text tokens are relatively rare then their contribution to the variance of the gradient estimator may be correspondingly small. On the other hand, if the model has not yet learned to frequently generate good sets of intermediary text tokens for the training examples, then the system may set β closer to 0, since in this case the signal from the incorrect set of intermediary text tokens may be less informative. The system can show that the variance of gradient estimators based on incorrect sets of intermediary text tokens may depend strongly on the model's accuracy π. Moreover, the system may show that choosing β=π can be optimal up to $O((1-\pi)^2)$ terms, and that the variance of the resulting estimator may be proportional to 1−π.

For each example $x_m$, $y_m$, the system can compute a $\beta_m \approx \mathbb{E}[\tilde{c}_m]$ in a way that ensures that $\beta_m$ is independent of $\nabla_\theta \log p_\theta(\tilde{z}_m|x_m)$. The system may assume that $$\mathbb{E}[\tilde{c}_m] \approx \frac{1}{M}\sum_m \mathbb{E}[\tilde{c}_m]$$

(e.g., that the per-example acceptance probability can be close to the average acceptance probability across the mini-batch), and the system can compute the leave-one-out estimate $$\beta_m = \frac{\sum_{m'\neq m} c'_{m'}\tilde{c}_{m'}}{\sum_{m'\neq m} c'_{m'}},$$

where $c'_m := c(z_{m'}, y)$. In some implementations, the system may restrict the estimate to consider only examples for which the system may have a correct set of intermediary text tokens (e.g., where $c'_m=1$), since these may be the only examples that influence the gradient estimate. Leaving out $\tilde{c}_m$ and $c'_m$ from the estimate $\beta_m$ may ensure that $\beta_m$ is independent of $\tilde{z}_m$.

In some implementations, the system can include gradient subsampling. The system can reduce the cost of the gradient estimator by using systematic resampling to select a subset of rationales. The reduction may not affect the expected value of the estimator as long as the marginal probability of selecting a set of intermediary text tokens is proportional to the corresponding weight $\tilde{w}_m$, and the averaged gradient can be reweighted by $$\frac{\sum_{m=1}^{2M} \tilde{w}_m}{\sum_m c'_m}.$$

In some implementations, the systems and methods can include one or more alternatives to the MCMC-EM approach. The alternatives may include variational EM (Bishop, *Pattern recognition and machine learning*, Springer, 2006.), reweighted wake-sleep (RWS) (Bornschein et al., "Reweighted wake-sleep," ARXIV (Apr. 16, 2015) https://arxiv.org/abs/1406.2751.), and/or rejection sampling.

Variational expectation-maximization can be a strategy for training latent-variable models.

RWS can be an alternative that avoids high-variance score-function gradients. RWS can proceed by sampling M samples $z_{1:M}$ from a guide model $q_\phi(z|x,y)$, assigning the samples weights $$w_m \propto \frac{p_\theta(y, z\mid x)}{q_\phi(z\mid x, y)},$$

and updating both the model parameters θ and the guide parameters ϕ to maximize the reweighted log-probabilities $\Sigma_m w_m \log p_\theta(z_m|x)$ and $\Sigma_m w_m \log q_\phi(z_m|x,y)$. RWS training may lead to degenerate zero-length sets of intermediary text tokens z. Shorter sequences with RWS can get higher weights, and the model and guide may learn to produce shorter and shorter sequences until they consistently produce empty sets of intermediary text tokens.

Longer sequences can tend to get lower weights. The system may augment the unnormalized weights as $$\tilde{w}_m = c(y, z_m)\frac{p_\theta(z_m \mid x)}{q_\phi(z_m \mid x, y)} = c(y, z_m)\prod_{t=1}^{T_m} \frac{p_\theta(z_{m,t} \mid x, z_{m,1:(t-1)})}{q_\phi(z_{m,t} \mid x, y, z_{m,1:(t-1)})},$$

where $T_m$ is the length of $z_m$ and ε may be added to address the case where none of the samples are correct. If there is a mismatch between $q(z_{m,t}|x,z_{m,1:(t-1)})$ and $p(z_{m,t}|x,z_{m,1:(t-1)})$, then $$\frac{p_\theta(z_{m,t} \mid x, z_{m,1:(t-1)})}{q_\phi(z_{m,t} \mid x, y, z_{m,1:(t-1)})}$$

may be less than one, with rare high-weight exceptions that may ensure that $\mathbb{E}_q\,[p(z|x)/q(z|x)]=1$.

If the exceptions are rare enough to not typically appear in a sample of M sequences $z_{1:M}$, then the normalized weights $$w_{1:M} = \frac{\tilde{w}_{1:M}}{\sum_m \tilde{w}_m}$$

may assign higher mass to shorter sequences unless those shorter sequences are much less likely to be correct.

With careful initialization and learning-rate tuning, the system can get RWS to avoid the potential problem of empty sets of intermediary text tokens. In some implementations, the guide $q_\phi(z|x,y)$ can be learned to closely mimic the prior $p(z|x)$ until the very end of the rationale, and can then paste in the correct answer whether or not the answer had anything to do with the set of intermediary text tokens up to that point.

Quantitatively, denoting by t the index of the token at which the "final answer" section of the set of intermediary text tokens begins, the average KL between $q(z_{1:t}|x,y)$ and $p(z_{1:t}|x)$ may be about 0.61 nats, while the conditional KL between $q(z_{(t+1):T}|x,y,z_{1:t})$ and $p(z_{(t+1):T}|x,z_{1:t})$ was about 42.5 nats, which may confirm that the guide was not "reasoning backwards" (e.g., copying the correct answer).

In some implementations, the system can include a rejection-sampling scheme in which the system samples K proposal sets of intermediary text tokens $z_{1:K}$ from $p(z|x)$, and may average the gradients from those sets of intermediary text tokens that lead to correct answers. The rejection-sampling scheme may include reducing the minibatch size by a factor of K to keep the per-iteration cost constant compared to TRICE, which in turn may lead to slower convergence.

In some implementations, the systems and methods can include a self-taught reasoner (e.g., the self-taught reasoner of Zelikman et al. "STaR: Bootstrapping Reasoning With Reasoning," ARXIV (Mar. 28, 2022), https://arxiv.org/abs/2203.14465.). Three potential differences between TRICE and STaR can include the use of greedy decoding, resampling, and/or set of intermediary text tokens updates. First, STaR can use greedy decoding, which may reduce the diversity of the sets of intermediary text tokens the system trains on. In some implementations, the greedy decoding can generate correct answers for the wrong reasons.

A second difference can be that TRICE resamples sets of intermediary text tokens every iteration to reduce the likelihood to overfit to any particular rationale. STaR may have an inner loop that runs many training iterations on a single set of rationales. For example, STaR may use stale sets of intermediary text tokens to estimate the gradient of the marginal likelihood.

The approximate policy-gradient algorithm trying may minimize the 0–1 loss $\mathbb{E}_p\,[1-c(z,y)]=1-p_\theta(y|x)$. The marginal likelihood may be derived from $p_\theta(y|x)\nabla_\theta \log p_\theta(y|x)$. For example, the derivative of the marginal log-likelihood (which TRICE can aim to maximize) may be weighted by $p_\theta(y|x)$.

Third, STaR can update the rationales. For example, STaR may replace a rationale from the model $p(z|x)$ with a rationale from a surrogate $q_\theta(z|x, y)$. As the model memorizes a set of correct rationales for the training set, STaR may be less likely to fall back on the surrogate, but the replacement strategy may affect early training dynamics.

The systems and methods can be evaluated on the GSM8K dataset (Cobbe et al. "Training verifiers to solve math word problems," ARXIV (Oct. 27, 2021), https://arxiv.org/abs/2110.14168.) and the 27 BigBench-Hard (BBH) tasks (Suzgun et al. "Challenging big-bench tasks and whether chain-of-thought can solve them," ARXIV (Oct. 17, 2022), https://arxiv.org/abs/2210.09261.) using the medium-size PaLM 2-M (Anil et al., "PaLM 2 Technical Report," ARXIV (May 17, 2023), https://arxiv.org/abs/2305.10403.), and/or Transformer-based LLM (Vaswani et al., "Attention Is All You Need," ARXIV (Jun. 12, 2017), https://arxiv.org/abs/1706.03762.). For the BBH experiments, the system may use the Flan instruction-tuned (Chung et al., "Scaling Instruction-Finetuned Language Models," ARXIV (Oct. 20, 2022), https://arxiv.org/abs/2210.11416.) version of PaLM 2. For GSM8K, the system may use the base PaLM 2 model. All experiments may be run on TPU v4 and v5e chips (Jouppi et al., "Tpu v4: An optically reconfigurable supercomputer for machine learning with hardware support for embeddings," IN PROCEEDINGS OF THE 50TH ANNUAL INTERNATIONAL SYMPOSIUM ON COMPUTER ARCHITECTURE, pp. 1-14, 2023.).

In some implementations, the systems and methods may fine-tune the model weights. Alternatively and/or additionally, the systems and methods may use prompt tuning (Lester et al., "The power of scale for parameter-efficient prompt tuning," IN PROCEEDINGS OF THE 2021 CONFERENCE ON EMPIRICAL METHODS IN NATURAL LANGUAGE PROCESSING, pp. 3045-3059, 2021.). The system may prepend a sequence of embedding vectors θ (a "soft prompt") to the embeddings corresponding to the tokenized chain-of-thought prompt used to condition the model. Prompt tuning can achieve similar accuracy gains to full fine-tuning, while using a small fraction of the parameters. The system may initialize the soft prompt with the embedding sequence obtained from a series of three (for BBH) or five (for GSM8K) exemplar chain-of-thought (CoT) prompts, each of the form "Question: <QUESTION>'nAnswer: Let's think step by step. 'n<RATIONALE>". The system may consider two initialization schemes: one where the system uses the standard few-shot CoT prompts that are provided with BBH, and one where the system may attempt to bootstrap a few-shot CoT prompt by sampling random questions from the training set, generating random sets of intermediary text tokens from the base model, and picking three or five examples where the random sets of intermediary text tokens lead to correct answers. The first scheme can be leveraged as a way of fine-tuning a good initial few-shot prompt, but the first scheme may rely on a small amount of detailed CoT supervision, while the second scheme may only rely on label supervision.

On each BBH task, the experiment may include splitting the examples into 60% train and 40% test sets. For all but three tasks, the split can be 150 training and 100 test examples. For GSM8K, the experiment may use the standard 7473-example training set and 1319-example test set. The experiment may evaluate CoT models' accuracy in two ways: first, using greedy (temperature-0) decoding, and second, using "self-consistency" (Wang et al., "Self-Consistency Improves Chain of Thought Reasoning in Language Models," arXiv (Mar. 21, 2022), https://arxiv.org/abs/2203.11171.). In self-consistency evaluation, the experiments may draw 40 samples and may check whether the most common answer is correct. The evaluation may be a plug-in estimator for the prediction $\text{argmax}_y p(y|x)$ that minimizes 0-1 loss under the model.

The experiment can compare the configurations against four baseline prompt-tuning methods: direct prompt tuning, CoT prompt tuning, rejection sampling, and STaR. All methods may be evaluated against the same validation sets, and may use the same training labels, few-shot prompts (except for direct tuning, which may only use question-answer pairs), and/or initialization strategies as appropriate.

Table 1 and table 2 can summarize the results. TRICE can be able to learn to generate sets of intermediary text tokens that lead to the correct answer even without human-generated exemplar rationales. TRICE may outperform a model trained directly on human-generated sets of intermediary text tokens on GSM8K.

Initializing the soft prompt with a human-generated 3-shot exemplar question-rationale-answer prompt may improve performance on BBH. Evaluating with self-consistency may improve performance. By the end of training, TRICE can manage to generate at least one valid set of intermediary text tokens for almost all training examples, while STaR fails to generate valid sets of intermediary text tokens for almost 10% of training examples.

| Prompt-Tuning Strategy | Initialization | Greedy-Decoding Acc. (%) | Self-Consistency Acc. (%) | % Valid Rationales |
|---|---|---|---|---|
| STaR | Bootstrapped | 62 | 62.1 | 91.6 |
| Rejection Sampling | 3-shot Q-R-A | 64.6 | 65.3 | — |
| TRICE without CV | | 67.8 | 68 | 98.7 |
| TRICE with CV | | 72.8 | 73.1 | 98.8 |
| Direct Prompt Tuning | 3-shot Q-A | 70.4 | — | — |
| TRICE without CV | 3-shot Q-R-A | 73.4 | 75.2 | 98.2 |
| TRICE with CV | | 76.7 | 77.6 | 98.6 |

Table 1 can depict average accuracies (columns 3 and 4) and fraction of training examples for which the models can generate correct sets of intermediary text tokens (column 5) across the 27 BIG-Bench Hard (BBH) tasks. All methods but direct prompt tuning in the experiment group use CoT prompting. All trainable prompts in the experiment are initialized with an embedding sequence obtained from a few-shot prompt containing either example question-answer pairs ("Q-A") or example question-rationale-answer triples ("Q-R-A"). For direct prompt tuning, the Q-A pairs come from the training set. For TRICE, the experiment can use either the three Q-R-A triples provided with BBH (bottom two rows) or bootstrap a set of sets of intermediary text tokens as described in the text. For STaR and rejection sampling, the experiment can evaluate on bootstrapped initializations.

| Prompt-Tuning Strategy | Greedy-Decoding Acc. (%) | Self-Consistency Acc. (%) | % Valid Rationales |
|---|---|---|---|
| STaR | 53.5 | 60.1 | 80.2 |
| CoT Prompt Tuning | 58.6 | 73.8 | — |
| Rejection Sampling | 77.9 | 87 | — |
| Direct Prompt Tuning | 19.4 | — | — |
| TRICE without CV | 72.8 | 81.5 | 98.9 |
| TRICE with CV | 74.7 | 82.3 | 98.8 |
| TRICE with CV (not bootstrapped) | 77.7 | 86.6 | 98.4 |

Table 2 can depict average accuracies (columns 2 and 3) and fraction of training examples for which the experiment can generate correct sets of intermediary text tokens (column 4) on GSM8K. Direct prompt tuning can be initialized with an embedding sequence obtained from a few-shot prompt containing example question-answer pairs ("Q-A"). All remaining prompt-tuning methods of the experiment may be initialized with an embedding sequence obtained from a few-shot prompt containing example question-rationale-answer triples ("Q-R-A") obtained randomly from the GSM8K training set or bootstrapped as described in the text.

The systems disclosed herein can include a method for tuning LLMs to be better at solving question-answering tasks using chain-of-thought (CoT) prompting. By framing the CoT-prompted LLM as a latent-variable model, the system can be able to derive a principled and effective fine-tuning method. When applied to GSM8K and BIG-Bench Hard (BBH) tasks, the system disclosed herein can outperform three strong baselines: direct prompt-tuning, STaR, and rejection sampling.

For BBH tasks experiments, the system may run TRICE for 500 steps with batch size M=32 and may not use subsampling (e.g., compute L=64 gradients per batch). The system may use the Adam optimizer (e.g., the optimizer in Kingma et al., "Adam: A Method for Stochastic Optimization," arXiv (Dec. 22, 2014), https://arxiv.org/abs/1412.6980.) with an initial learning rate 1.0 and a cosine decay schedule (Loshchilov et al., "SGDR: Stochastic gradient descent with warm restarts," In International Conference on Learning Representations (2017), https://openreview.net/forum?id=Skq89Scxx.) that may reduce the learning rate by 10× over the first 450 steps. For GSM8K, the experiments may include running TRICE for 5000 steps with a constant learning rate of 1.0, batch size M=128, and may compute L=128 gradients per batch.

For the experiments, the bootstrap reasoning may use an adaptation of the STaR strategy, where the system may perform prompt-tuning rather than fine-tuning on all weights. The method may alternate between updating the memory and retuning the model from scratch on the updated memory in an inner loop. The experiments may apply the procedure for 10 outer-loop steps. The system may start with 40 inner-loop optimization steps and may increase the number of inner-loop steps by 20% each outer-loop iteration up to a maximum of 200 steps. If the training loss goes below 0.01, the system may break out of the inner loop. For STaR's inner-loop optimization, the system may use the same prompt-tuning initialization, Adam hyperparameters as above, but with cosine decay from 1.0 to 0.1 over the course of each inner loop. To update the STaR memory, the experiments may first try generating a set of intermediary text tokens from the prompt-tuned model by greedy decoding, then if that set of intermediary text tokens is incorrect fall back on a rationalization generated by greedy decoding from the same guide model used in TRICE to initialize the MCMC memory, and finally if neither procedure generates a valid set of intermediary text tokens the experiments may omit the example from the memory.

For the experiments, the rejection sampling may include reducing mini-batch size by 4 and drawing 4 sets of intermediary text tokens for each example in the mini-batch. The experiments may use the same mini-batch size, train steps, and optimizer as in TRICE for all BBH and GSM8K experiments. In BBH, the system may use the initial learning rate 1.0 as in TRICE. In GSM8K, the experiments may use the learning rate 0.1, because the experiments may achieve better results than learning rate 0.3, and the training procedure may become unstable with learning rate 1.0.

To do supervised CoT tuning, the experiments may prompt-tune the model to maximize the log-likelihoods of the training sets of intermediary text tokens given questions. The BBH datasets may include very few exemplar rationales. On GSM8K, the experiments may use the same hyperparameters as in TRICE except that we early-stop the algorithm after only 1000 train steps, since the model overfits badly when the system runs longer.

In the experimental implementation of the direct prompt tuning method, the model may attempt to guess the answer directly without generating a rationale. Prompt-tuning to maximize the log-likelihood of the answers in this setup may be configured to be straightforward, since there may be no latent set of intermediary text tokens to integrate out. The experiments may initialize the soft prompt using 3 examples from the training set and truncate its length to 64. The optimization procedure may be carried out over 150 steps with batch size 16 and the same Adam hyperparameters as above, except that the cosine decay period is set to 150 instead of 450.

To apply the systems and methods disclosed herein beyond question-answering problems, a nondeterministic likelihood model may be utilized. For example, the desired output y may be a summary of a text x, and z may be a scratchpad or outline. In some implementations, there may be many y's that are appropriate for a given x and z. From a modeling perspective, p(y|x, z) may have nonzero entropy. As the number of reasonable values that y could take given x increases, the probability of sampling the precise y that was observed may go down at a rate that may be exponential in the size of the output space.

The differences in a nondeterministic likelihood configuration can include: (1) the acceptance probability for an independence sampler where the proposals are generated from $$p(z \mid x) \text{ is } \alpha(\tilde{z} \mid z) = \min\left\{1, \frac{p(y \mid \tilde{z}, x)}{p(y \mid z, x)}\right\}.$$

For example, instead of deterministically accepting correct proposed latents $\tilde{z}$, the system may update the memory probabilistically, always accepting proposals that make the observed y more likely, but sometimes may accept proposals that make y a little less likely. (2) The control-variate weights $\beta_m$ can be a function of the acceptance probabilities $\alpha$:

$$\beta_m = \frac{1}{M-1}\sum_{m' \neq m} \alpha(\tilde{z}_{m'} \mid z_{i_{m'}}).$$

The value of the control variate in the nondeterministic configuration may be less than the control variate when in the deterministic-likelihood setting.

In some implementations, the system can include a variance of the kth element $\hat{g}_k$ of the gradient estimator. To minimize clutter, the system may suppress subscript indices and define $g'=\nabla_{\theta_k} \log p(z'|x)$, $\tilde{g}=\nabla_{\theta_k} \log p(\tilde{z}|x)$, and $g=\nabla_{74_k} \log p(z|x)$, where z' is the updated rationale, $\tilde{z}$ is the proposed rationale, and z is the previous set of intermediary text tokens in memory. The gradient can be $g'=\tilde{g}$ if the proposal $\tilde{z}$ is accepted and $g'=g$ if $\tilde{z}$ is rejected. The system may be configured to assume that the previous set of intermediary text tokens z is a sample from p(z|x,y). The shorthands can be defined as $g_+=\mathbb{E}[\tilde{g}|c(\tilde{z},y)=1]$, $g_-=\mathbb{E}[\tilde{g}|c(\tilde{z},y)=0]$, $v=\mathrm{Var}(\tilde{g})=\mathbb{E}[\tilde{g}^2]$, $v_+=\mathrm{Var}(\tilde{g}|c(\tilde{z},y)=1)$, $v_-=\mathrm{Var}(\tilde{g}|c(\tilde{z},y)=0)$. Additionally and/or alternatively, the probability of accepting a proposal can be defined as $\pi=\mathbb{E}[c(\tilde{z},y)]$.

The gradient estimator can be $$\hat{g} = g' - \beta\tilde{g};\ \mathbb{E}[\hat{g}] = g_+. \tag{6}$$

The variance of $\hat{g}$ can be $$\mathbb{E}\left[(g' - g_+ - \beta\tilde{g})^2\right] = \mathbb{E}\left[(g' - g_+)^2\right] + \beta^2\mathbb{E}\left[\tilde{g}^2\right] - 2\beta\mathbb{E}[(g' - g_+)\tilde{g}] \tag{7}$$

$$= v_+ + \beta^2 v - 2\beta\mathbb{E}[g'\tilde{g}]. \tag{8}$$

In equation 8, $\mathbb{E}[\tilde{g}]=0$ and $g_+$ can be nonrandom and therefore independent of $\tilde{g}$. Breaking out the cases where $c(\tilde{z},y)=0$ (so $g'=g$) and $c(\tilde{z},y)=1$ (so $g'=\tilde{g}$), the rightmost expectation can be $$\mathbb{E}[g'\tilde{g}] = \pi\mathbb{E}\left[\tilde{g}^2 \mid c(\tilde{z}, y) = 1\right] + (1-\pi)\mathbb{E}[g\tilde{g} \mid c(\tilde{z}, y) = 0] \tag{9}$$

$$= \pi\left(v_+ + g_+^2\right) + (1-\pi)g_+g_-. \tag{10}$$

The term on the right can be simplified, since $$0 = \mathbb{E}[\tilde{g}] = \pi g_+ + (1-\pi)g_-,\ (1-\pi)g_+g_- = -\pi g_+^2.$$

Plugging the simplification into equation 10, the simplified equation may be $$\mathbb{E}[g'\tilde{g}] = \pi\left(v_+ + g_+^2\right) - \pi g_+^2 = \pi v_+. \tag{11}$$

The variance of $\hat{g}$ can simplify to $$\mathrm{Var}(\hat{g}) = (1 - 2\beta\pi)v_+ + \beta^2 v. \tag{12}$$

Taking the derivative with respect to $\beta$ can show that the equation can be minimized when $$2(\beta v - \pi v_+) = 0;\ \beta^{å} = \pi\frac{v_+}{v}. \tag{13}$$

Plugging the minimization back into equation 12 can give the optimal variance $v^{å}$:

$$v^{å} = v_+ + \pi^2\frac{v_+^2}{v} - 2\pi^2\frac{v_+^2}{v} = v_+\left(1 - \pi^2\frac{v_+}{v}\right). \tag{14}$$

v can be expanded by considering the case where $c(\tilde{z},y)=1$ (which happens with probability π and the case where $c(\tilde{z},y)=0$ (which happens with probability 1−π):

$$\begin{aligned} v = \mathbb{E}[\tilde{g}^2] &= \pi v_+ + \pi g_+^2 + (1-\pi)v_- + (1-\pi)g_-^2 \\ &= \pi v_+ - (1-\pi)g_+g_- + (1-\pi)v_- - \pi g_+g_- \\ &= \pi v_+ + (1-\pi)v_- - g_+g_- \\ &= \pi v_+ + (1-\pi)v_- + \frac{1-\pi}{\pi}g_-^2 \\ &= \pi v_+ + (1-\pi)v_- + (1-\pi)(2-\pi)g_-^2 + O\left((1-\pi)^3\right) \\ &= \pi v_+ + (1-\pi)v_- + (1-\pi)(1+1-\pi)g_-^2 + O\left((1-\pi)^3\right) \\ &= \pi v_+ + (1-\pi)\left(v_- + g_-^2\right) + O\left((1-\pi)^2\right) \end{aligned}, \tag{15}$$

where in the second line the system can leverage the fact that $\pi g_+=-(1-\pi)g_-$, and in the third-to-last line the system can approximate 1/π with the first-order Taylor approximation $$\frac{1}{\pi} = 2 - \pi + O\left((1-\pi)^2\right).$$

Thus, the equation can be rewritten as $$\begin{aligned} \pi\frac{v_+}{v} &= \frac{\pi v_+}{\pi v_+ + (1-\pi)\left(v_- + g_-^2\right) + O\left((1-\pi)^2\right)} \\ &= \left(1 + \frac{1-\pi}{\pi v_+}\left(v_- + g_-^2\right) + O\left((1-\pi)^2\right)\right)^{-1} \\ &= 1 - \frac{1-\pi}{\pi v_+}\left(v_- + g_-^2\right) + O\left((1-\pi)^2\right) \end{aligned}. \tag{16}$$

Therefore, the optimal variance $v^{å}$ can be $$\begin{aligned} v^{å} &= v_+\left(1 - \pi^2\frac{v_+}{v}\right) \\ &= v_+\left(1 - \pi + \frac{1-\pi}{v_+}\left(v_- + g_-^2\right) + O\left((1-\pi)^2\right)\right) \\ &= (1-\pi)\left(v_+ + v_- + g_-^2\right) + O\left((1-\pi)^2\right)) \end{aligned}. \tag{17}$$

By contrast, plugging the heuristic value of β=π into equation 12 can give the suboptimal variance $v^{\pi}$:

$$\begin{aligned} v^{\pi} &= \left(1 - 2\pi^2\right)v_+ + \pi^2 v \\ &= \left(1 - 2\pi^2\right)v_+ + \pi^2\left(\pi v_+ + (1-\pi)\left(v_- + g_-^2\right) + O\left((1-\pi)^2\right)\right) \\ &= \left(1 - 2\pi^2 + \pi^3\right)v_+ + \pi^2(1-\pi)\left(v_- + g_-^2\right) + O\left((1-\pi)^2\right) \\ &= (1-\pi)\left(v_+ + v_- + g_-^2\right) + O\left((1-\pi)^2\right) \end{aligned}, \tag{18}$$

where the system may use the approximation $\pi^k=(1-(1-\pi))^k=1-k(1-\pi)+O((1-\pi)^2)$ to simplify the $\pi^2$ and $\pi^3$ terms. Thus, $v^{å}$ and $v^{\pi}$ may be the same up to $O((1-\pi)^2)$, and as the probability π of getting the correct answer increases, the suboptimality of setting β=π may go down faster than the variance does.

Gradient estimators based solely on incorrect sets of intermediary text tokens may be utilized and may center on the identity $$0 = \mathbb{E}[\tilde{g}] = \pi g_+ + (1-\pi)g_-, \tag{19}$$

which relates the gradient the system may want to estimate $g_+$ (the expected gradient given that the set of intermediary text tokens is correct) to $g_-$ (the expected gradient given that the set of intermediary text tokens is incorrect).

Equation 19 can imply that $$g_+ = -\frac{1-\pi}{\pi}g_-. \tag{20}$$

The systems and methods may consider the variance of an estimator based on the right hand side of equation 20:

$$\begin{aligned} \mathbb{V}\left[-\frac{1-c(\tilde{z},y)}{\pi}\tilde{g}\right] &= \mathbb{E}\left[\frac{(1-c(\tilde{z},y))^2}{\pi^2}\tilde{g}^2\right] - g_+^2 \\ &= \frac{1-\pi}{\pi^2}\left(v_- + g_-^2\right) - g_+^2 \\ &= \frac{1-\pi}{\pi^2}\left(v_- + g_-^2\right) - \frac{(1-\pi)^2}{\pi^2}g_-^2 \\ &= \frac{1-\pi}{\pi^2}\left(v_- + \pi g_-^2\right) \end{aligned}. \tag{21}$$

If π is small, then the equation can become $$\frac{1-\pi}{\pi^2}\left(v_- + \pi g_-^2\right) = \frac{v_-}{\pi^2} + O\left(\pi^{-1}\right), \tag{22}$$

such that unless the variance $v_-$ of incorrect sets of intermediary text tokens is very low, the variance of this estimator may be $O(\pi^{-2})$, which is very high. By contrast, the variance of a gradient estimator based purely on correct sets of intermediary text tokens may be simply $v_+$. Therefore, unless the gradient variance for incorrect sets of intermediary text tokens is dramatically lower than that for correct rationales, then if π is small then incorrect sets of intermediary text tokens may lead to much noisier gradient estimates.

On the other hand, if 1−π is small, then the equation may be $$\frac{1-\pi}{\pi^2}\left(v_- + \pi g_-^2\right) = (1-\pi)\left(v_- + g_-^2\right) + O\left((1-\pi)^2\right), \tag{23}$$

which may go to zero as π approaches 1.

Equation 20 can imply that, in principle, given unbiased estimates for 1−π and $\pi^{-1}$, the system may compute gradient updates purely based on sets of intermediary text tokens that fail to obtain the correct answer. Unbiased estimates of 1−π may be obtained. The system may rely on the compute $1-c(\tilde{z},y)$. Unbiased estimates of $\pi^{-1}$ may then be obtained.

The system may compute a biased estimator that ignores the $\pi^{-1}$ term and then correct for the bias:

$$\mathbb{E}[-(1-c(\tilde{z},y))\tilde{g}] = -(1-\pi)g_- = \pi g_+ = g_+ - (1-\pi)g_+ \quad (24)$$

The expected value of the estimator $-(1-c(\tilde{z},y))\tilde{g}$ may be too small by a factor of $(1-\pi)g_+$. The system can then correct the bias by adding in an unbiased estimator of it that uses g (the gradient for a correct set of intermediary text tokens from memory):

$$\mathbb{E}[-(1-c(\tilde{z},y))(\tilde{g}-g)] = g_+ - (1-\pi)g_+ + (1-\pi)g_+ = g_+. \quad (25)$$

The gradient estimator described above may be utilized by TRICE when the sampled set of intermediary text tokens $\tilde{g}$ is incorrect and $\beta=1$. Smaller values of $\beta$ may be interpolated between this estimator and an estimator based purely on correct sets of intermediary text tokens.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for model tuning, the system comprising:

one or more processors; and one or more non-transitory computer-readable media that collectively store instructions that, when executed by the one or more processors, cause the computing system to perform operations, the operations comprising:

obtaining a training dataset, wherein the training dataset comprises a plurality of training examples, wherein a first training example of the plurality of training examples comprises a first input and a respective first set of output tokens associated with the first input;

obtaining a stored set of intermediary text tokens associated with the first training example;

processing the first input with a machine-learned model to generate a predicted set of intermediary text tokens and a predicted set of output text tokens, wherein the predicted set of output text tokens is determined based at least in part on the predicted set of intermediary text tokens;

determining the predicted set of intermediary text tokens and the stored set of intermediary text tokens are associated with a different result; and in response to determining the predicted set of intermediary text tokens and the stored set of intermediary text tokens are associated with a different result, adjusting one or more parameters of the machine-learned model based on a combined gradient of a loss function, wherein the combined gradient is based on a difference between a first gradient associated with the stored set of intermediary text tokens and a second gradient associated with the predicted set of intermediary text tokens.

2. The system of claim 1, wherein adjusting the one or more parameters of the machine-learned model comprises adjusting a probability of the machine-learned model generating an output associated with the stored set of intermediary text tokens.

3. The system of claim 1, wherein the stored set of intermediary text tokens is included in the training dataset.

4. The system of claim 1, wherein the difference between a first gradient associated with the stored set of intermediary text tokens and the second gradient associated with the predicted set of intermediary text tokens comprises a weighted difference, the weighted difference being weighted by a control variate value, and wherein the machine-learned model comprises a latent-variable model.

5. The system of claim 1, wherein the training dataset comprises a second training example, wherein the second training example comprises a second input and a second set of output tokens, wherein the second set of output tokens is responsive to the second input, and wherein the operations further comprise:

processing the second input with the machine-learned model to generate a second predicted set of intermediary text tokens and a second set of predicted output tokens, wherein the second set of predicted output tokens is determined at least in part on the second predicted set of intermediary text tokens;

determining the second set of output tokens and the second set of predicted output tokens are associated with a similar result; and in response to determining the second set of output tokens and the second set of predicted output tokens are associated with a similar result, replacing a stored second set of intermediary text tokens with the second predicted set of intermediary text tokens in a set of intermediary text tokens memory associated with the second input.

6. The system of claim 1, wherein the operations comprise processing the first input with the machine-learned model to generate the stored set of intermediary text tokens.

7. The system of claim 1, wherein processing the first input with the machine-learned model to generate the predicted set of intermediary text tokens and the predicted set of output text tokens comprises temperature being set to one.

8. The system of claim 1, wherein the stored set of intermediary text tokens comprise a plurality of text strings that are fed back into the machine-learned model to perform a next inference to generate at least one of the next intermediary text token or a plurality of output text tokens, and wherein the stored set of intermediary text tokens is obtained based on a stored set of output tokens for the stored set of intermediary text tokens being determined to be associated with the respective first set of output tokens; and wherein the stored set of output tokens comprises a text string generated by:

processing a stored input with the machine-learned model to generate a first stored intermediary text token of the stored set of intermediary text tokens;

processing the stored input and the first stored intermediary text token of the stored set of intermediary text tokens with the machine-learned model one or more next intermediary text tokens of the stored set of intermediary text tokens; and processing the stored input and the stored set of intermediary text tokens with the generative model to generate the stored set of output tokens.

9. The system of claim 1, wherein determining the predicted set of output text tokens and the first set of output text tokens are associated with a different result comprises:

determining the predicted set of output text tokens is incorrect.

10. The system of claim 1, wherein the first input comprises text data descriptive of an input prompt, and wherein the first set of output tokens set of output text tokens comprises set of output text tokens token data descriptive of an example set of output text tokens for the input prompt.

11. A computer-implemented method for generative model training, the method comprising:

obtaining, by a computing system comprising one or more processors, a training dataset, wherein the training dataset comprises a plurality of training examples, wherein a first training example of the plurality of training examples comprises a first input and a respective first set of output tokens associated with the first input;

obtaining, by the computing system, a stored set of intermediary text tokens associated with the first training example;

processing, by the computing system, the first input with a machine-learned model to generate a predicted set of intermediary text tokens;

processing, by the computing system, the predicted set of intermediary text tokens with the machine-learned model to generate a predicted set of output text tokens;

determining, by the computing system, the predicted set of output text tokens is associated with an incorrect set of output tokens based on the respective first set of output tokens; and in response to determining the predicted set of output text tokens is associated with an incorrect set of output tokens, adjusting, by the computing system, one or more parameters of the machine-learned model based on a combined gradient of a loss function, wherein the combined gradient is based on a difference between a first gradient associated with the stored set of intermediary text tokens and a second gradient associated with the predicted set of intermediary text tokens.

12. The method of claim 11, wherein processing, by the computing system, the first input with the machine-learned model to generate the predicted set of intermediary text tokens comprises:

determining, by the computing system, a plurality of set of intermediary text tokens intermediary text embeddings determined to be associated with the first input;

determining, by the computing system, an average set of intermediary text tokens intermediary text embedding for the plurality of set of intermediary text tokens intermediary text embeddings; and generating, by the computing system, the predicted set of intermediary text tokens based on the average set of intermediary text tokens intermediary text embedding.

13. The method of claim 11, further comprising:

performing, by the computing system, a plurality of training loops with a particular set of training examples of the plurality of training examples;

determining, by the computing system, a subset of the particular set of training examples iteratively generate correct results; and performing, by the computing system, additional training loops with the training dataset without the subset.

14. The method of claim 11, wherein the machine-learned model is trained to determine a joint probability distribution over inputs, output tokens, and intermediary tokens.

15. The method of claim 11, wherein adjusting, by the computing system, the one or more parameters of the machine-learned model comprises determining a parameter adjustment based at least in part on a control variate, wherein the control variate reduces the parameter adjustment as a global accuracy of the machine-learned model increases, wherein the global accuracy is determined based on a probability of generating correct sets of intermediary text tokens on the training set.

16. The method of claim 11, wherein the predicted set of intermediary text tokens comprises a sequence of inferences, and wherein the predicted set of output text tokens comprises a determined result associated with the sequence of inferences.

17. One or more non-transitory computer-readable media that collectively store instructions that, when executed by one or more computing devices, cause the one or more computing devices to perform operations, the operations comprising:

obtaining a prompt, wherein the prompt is descriptive of input text data;

processing the prompt with a machine-learned model to generate an output, wherein the output comprises a predicted set of output text tokens and a respective predicted set of intermediary text tokens associated with the predicted set of output text tokens, wherein the machine-learned model was trained to generate an output set of intermediary text tokens with an output set of output text tokens by training the machine-learned model on training datasets that comprise an input example and a training set of output text tokens, and wherein training comprises:

generating the output set of intermediary text tokens and determining whether to store the output set of intermediary text tokens based on comparing the output set of output text tokens to the training set of output text tokens for the input example;

storing the output set of intermediary text tokens;

processing the input example with the machine-learned model to generate a predicted intermediary text tokens and predicted output text tokens;

determining the predicted intermediary text tokens and the stored output set of intermediary text tokens are associated with a different result;

in response to determining the predicted intermediary text tokens and the stored output set of intermediary text tokens are associated with a different result, adjusting one or more parameters of the machine-learned model based on a combined gradient of a loss function, wherein the combined gradient is based on a difference between a first gradient associated with the stored output set of intermediary text tokens and a second gradient associated with the predicted intermediary text tokens; and providing the output to a user.

18. The one or more non-transitory computer-readable media of claim 17, wherein processing the prompt with the machine-learned model to generate the output comprises:

processing the prompt to determine the respective predicted set of intermediary text tokens; and processing the prompt and the respective predicted set of intermediary text tokens to generate the predicted set of output text tokens.

19. The one or more non-transitory computer-readable media of claim 17, wherein the respective predicted set of intermediary text tokens is determined based on one or more stored text tokens.

20. The one or more non-transitory computer-readable media of claim 17, wherein the prompt and the output comprise natural language text strings.

21. A computer-implemented method, the method comprising:

obtaining, by a computing system comprising one or more processors, a triplet training dataset, wherein the triplet training dataset comprises a first triplet training set, wherein the first triplet training set comprises a training input example, a training set of intermediary text tokens, and a training set of output text tokens, wherein the training set of intermediary text tokens comprises data descriptive of a set of intermediary text tokens generated by a first machine-learned model in response to processing the training input example, wherein the first machine-learned model was trained on a first loss function that comprises a combined gradient that is based on a difference between a first gradient associated with a previously stored set of intermediary text tokens and a second gradient associated with a model inference set of intermediary text tokens;

processing, by the computing system, the training input example with a second machine-learned model to generate a predicted set of intermediary text tokens and a predicted set of output text tokens;

evaluating, by the computing system, a second loss function that evaluates a difference between the predicted set of intermediary text tokens and the training set of intermediary text tokens; and adjusting, by the computing system, one or more parameters of the second machine-learned model based at least in part on the second loss function.

* * * * *